United States Patent
Shipman et al.

(10) Patent No.: US 10,040,511 B2
(45) Date of Patent: Aug. 7, 2018

(54) REAR DERAILLEUR

(71) Applicant: SRAM, LLC, Chicago, IL (US)

(72) Inventors: Christopher Shipman, Chicago, IL (US); Brian Jordan, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 243 days.

(21) Appl. No.: 15/183,913

(22) Filed: Jun. 16, 2016

(65) Prior Publication Data

US 2016/0288878 A1  Oct. 6, 2016

Related U.S. Application Data

(62) Division of application No. 13/691,391, filed on Nov. 30, 2012, now Pat. No. 9,394,030.

(60) Provisional application No. 61/706,357, filed on Sep. 27, 2012.

(51) Int. Cl.
| | | |
|---|---|---|
| *B62M 9/122* | (2010.01) | |
| *B62M 25/08* | (2006.01) | |
| *B62M 9/132* | (2010.01) | |
| *F16H 1/16* | (2006.01) | |

(52) U.S. Cl.
CPC ............ *B62M 9/122* (2013.01); *B62M 9/132* (2013.01); *B62M 25/08* (2013.01); *F16H 1/16* (2013.01)

(58) Field of Classification Search
CPC ...... B62M 9/122; B62M 9/132; B62M 25/08; F16H 1/16
USPC .......................................................... 474/80
See application file for complete search history.

(56) References Cited

U.S. PATENT DOCUMENTS

| | | |
|---|---|---|
| 1,752,373 A | 4/1930 | Charles et al. |
| 5,328,414 A | 7/1994 | Ancarani Restelli |
| 5,470,277 A | 11/1995 | Romano |
| 5,480,356 A | 1/1996 | Campagnolo |
| 5,653,649 A | 8/1997 | Watarai |
| 6,023,646 A | 2/2000 | Kubacsi et al. |
| 6,162,140 A | 12/2000 | Fukuda |
| 6,204,775 B1 | 3/2001 | Kubacsi |
| 6,623,389 B1 | 9/2003 | Campagnolo |
| 6,682,087 B1 | 1/2004 | Takeda |
| 6,781,510 B2 | 8/2004 | Takeda |
| 6,896,277 B2 | 5/2005 | Meggiolan |
| 6,917,283 B2 | 7/2005 | Takeda |
| 6,923,355 B2 | 8/2005 | Campagnolo |
| 6,945,888 B2 | 9/2005 | Fukuda et al. |

(Continued)

FOREIGN PATENT DOCUMENTS

| | | |
|---|---|---|
| EP | 841243 | 5/1998 |
| EP | 1752373 | 11/2008 |
| JP | 2002-53091 | 2/2002 |

OTHER PUBLICATIONS

Mavic, "Mektronic" 1999, http://www.mavic.com/history/mektronic.

*Primary Examiner* — William E Dondero
*Assistant Examiner* — Robert T Reese

(57) ABSTRACT

An electronic rear derailleur for a bicycle, includes a base member for attachment to a frame member of the bicycle, and a movable member having a cage assembly attached thereto. The electronic rear derailleur may also include a linkage coupling the movable member to the base member and configured to permit movement of the movable member relative to the base member, and a motor positioned at the movable member, the motor configured to operate the linkage to move the movable member relative to the base member.

28 Claims, 24 Drawing Sheets

(56) References Cited

U.S. PATENT DOCUMENTS

| | | |
|---|---|---|
| 7,086,974 B2 | 8/2006 | Dal Pra |
| 7,100,932 B2 | 9/2006 | Meggiolan |
| 7,243,937 B2 | 7/2007 | Ishikawa |
| 7,255,660 B2 | 8/2007 | Del Pra |
| 7,267,352 B2 | 9/2007 | Ishikawa |
| 7,290,458 B2 | 11/2007 | Fukuda |
| 7,320,655 B2 | 1/2008 | Fukuda |
| 7,381,142 B2 | 6/2008 | Campagnolo |
| 7,411,307 B2 | 8/2008 | Uno |
| 7,467,567 B2 | 12/2008 | Fukuda |
| 7,623,931 B2 | 11/2009 | Campagnolo et al. |
| 7,704,173 B2 † | 4/2010 | Ichida |
| 7,761,212 B2 | 7/2010 | Takebayashi |
| RE41,782 E † | 9/2010 | Fukuda |
| 7,892,122 B2 † | 2/2011 | Fukuda |
| 7,980,974 B2 † | 7/2011 | Fukuda |
| 8,025,597 B2 † | 9/2011 | Takamoto |
| 8,137,223 B2 | 3/2012 | Watarai et al. |
| 8,162,191 B2 | 4/2012 | Tetsuka et al. |
| 8,220,679 B2 | 7/2012 | Yoshida et al. |
| 8,655,561 B2 † | 2/2014 | Kitamura |
| 2003/0038625 A1 † | 2/2003 | Guderzo |
| 2004/0102270 A1 | 5/2004 | Fukuda |
| 2004/0114407 A1 | 6/2004 | Kitamura et al. |
| 2005/0156001 A1 | 7/2005 | Dal Pra et al. |
| 2005/0199083 A1 | 9/2005 | Meggiolan |
| 2005/0239587 A1 | 10/2005 | Ichida et al. |
| 2005/0255831 A1 † | 11/2005 | Kato |
| 2007/0037645 A1 † | 2/2007 | Ishikawa |
| 2008/0227572 A1 | 9/2008 | Sakaue |
| 2008/0238367 A1 | 10/2008 | Guderzo |
| 2009/0209375 A1 | 8/2009 | Takamoto |
| 2009/0240858 A1 | 9/2009 | Takebayashi |
| 2009/0315692 A1 | 12/2009 | Miki et al. |
| 2011/0320093 A1 | 12/2011 | Kitamura |

† cited by third party

REAR DERAILLEUR

This application is a divisional application of U.S. Non-Provisional application Ser. No. 13/691,391, filed Nov. 30, 2012, which claims the benefit of U.S. Provisional Application No. 61/706,357 filed Sep. 27, 2012.

BACKGROUND OF THE INVENTION

The invention relates to bicycle derailleurs. In particular, the invention is directed to electromechanical rear derailleurs.

SUMMARY OF THE INVENTION

One aspect of the invention is an electronic rear derailleur for a bicycle, including a base member for attachment to a frame member of the bicycle. The derailleur also includes a movable member having a cage assembly attached thereto. The derailleur also includes a linkage coupling the movable member to the base member and configured to permit movement of the movable member relative to the base member, and a motor positioned at the movable member, the motor configured to operate the linkage to move the movable member relative to the base member.

Another aspect of the invention is an electronic rear derailleur for a bicycle, including a base member for attachment to a frame member of the bicycle. The derailleur also includes a movable member having a cage assembly attached thereto. The derailleur also includes a linkage coupling the movable member to the base member and configured to permit movement of the movable member relative to the base member, and a transmission positioned on the movable member, the transmission configured to move the movable member relative to the base member.

In an embodiment, the electronic rear derailleur may include a button positioned on the movable member for accessing one or more operating parameter, such as a pairing function or parameter, of the electronic rear derailleur.

In an embodiment, the electronic rear derailleur may include a power supply configured to provide power to the motor. The power supply may be removably connected to the base member.

DETAILED DESCRIPTION OF THE INVENTION

Embodiments of the invention will herein be described with reference to the drawings. It will be understood that the drawings and descriptions set out herein are provided for illustration only and do not limit the invention as defined by the claims appended hereto and any and all their equivalents. For example, the terms "first" and "second," "front" and "rear," or "left" and "right" are used for the sake of clarity and not as terms of limitation. Moreover, the terms refer to bicycle mechanisms conventionally mounted to a bicycle and with the bicycle oriented and used in a standard fashion unless otherwise indicated.

Figure 1:
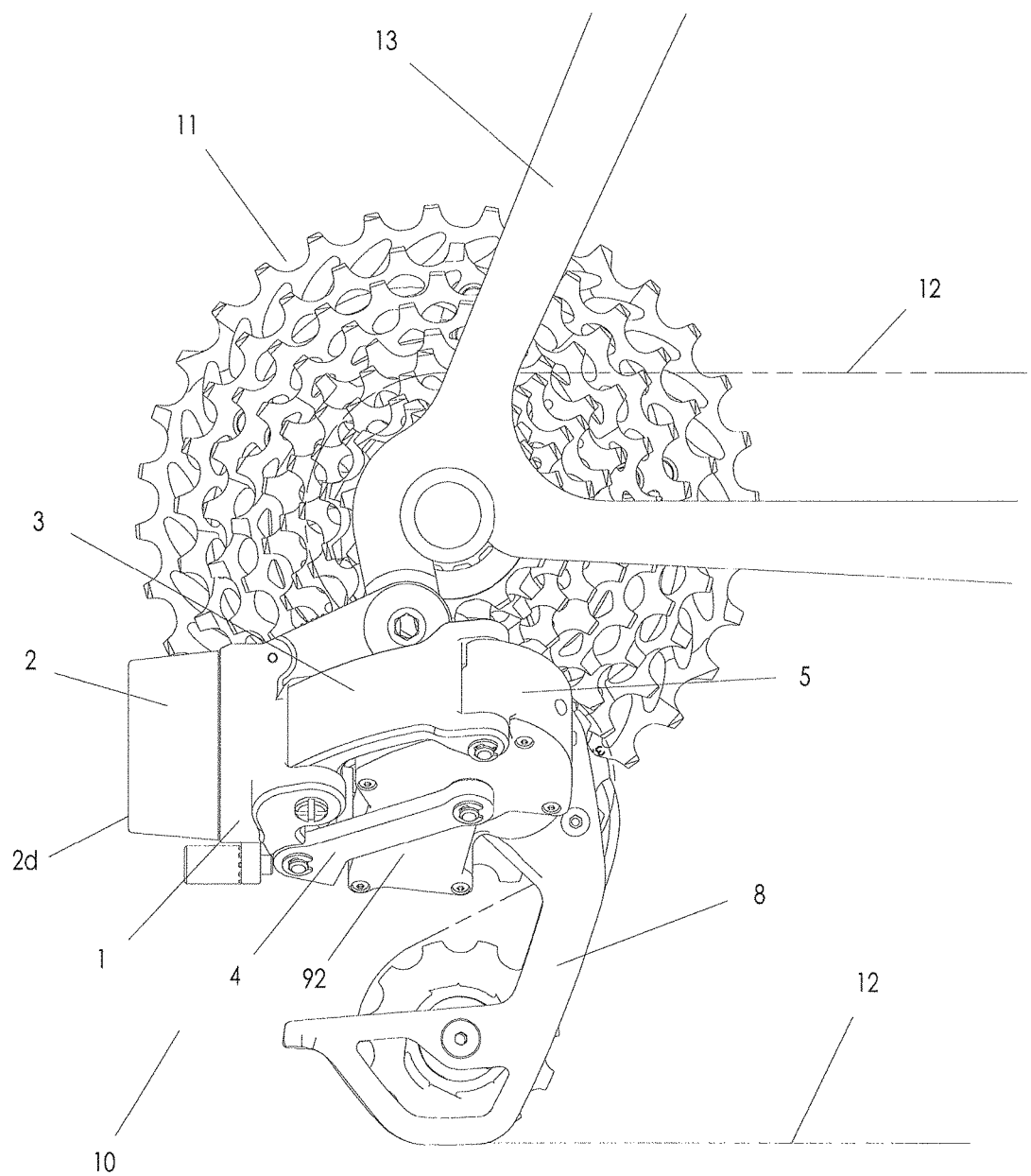
FIG. 1 is a rear derailleur assembly installed on a bicycle.
Figure 2:
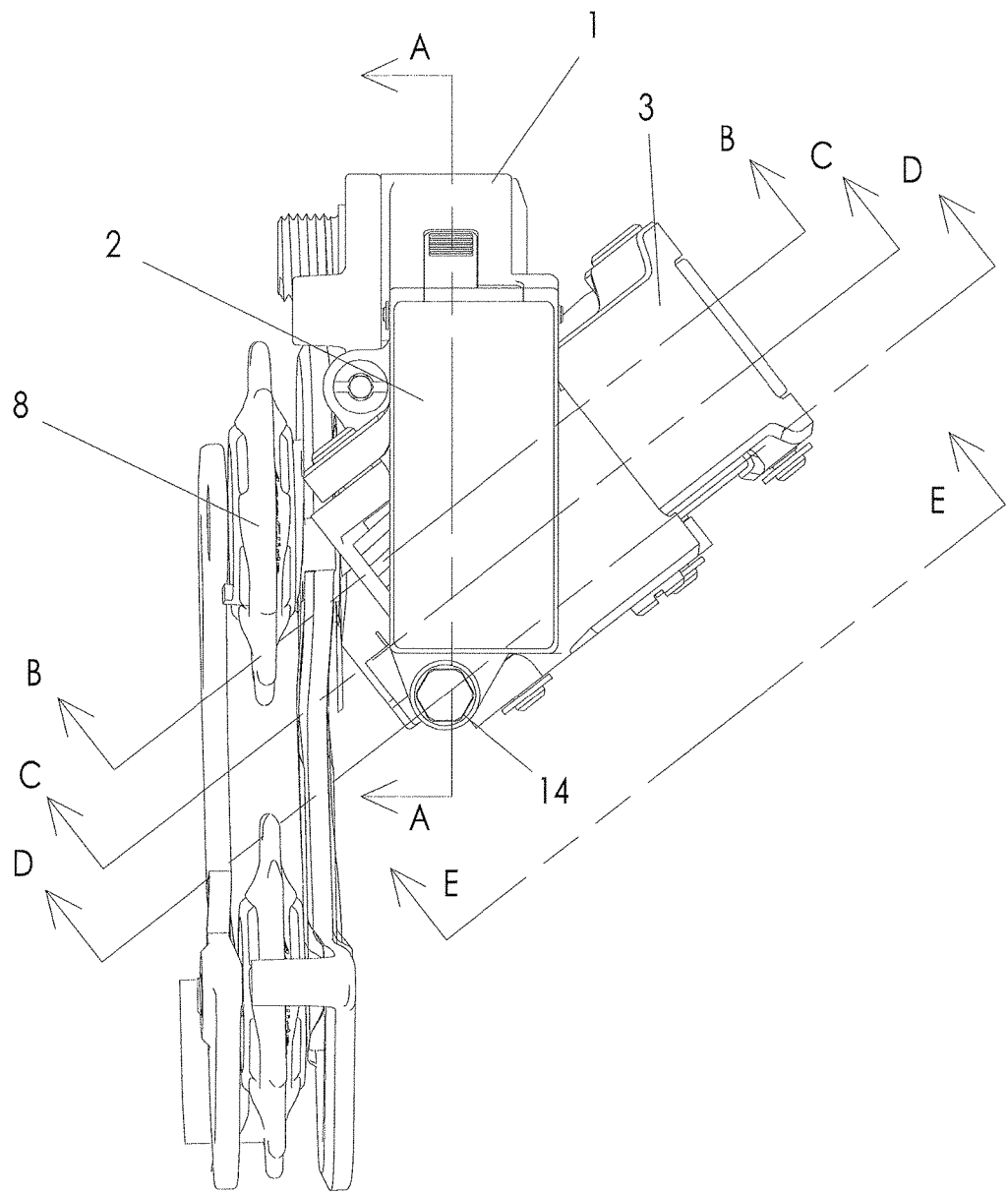
FIG. 2 is a rear view of the rear derailleur assembly.
Figure 3:
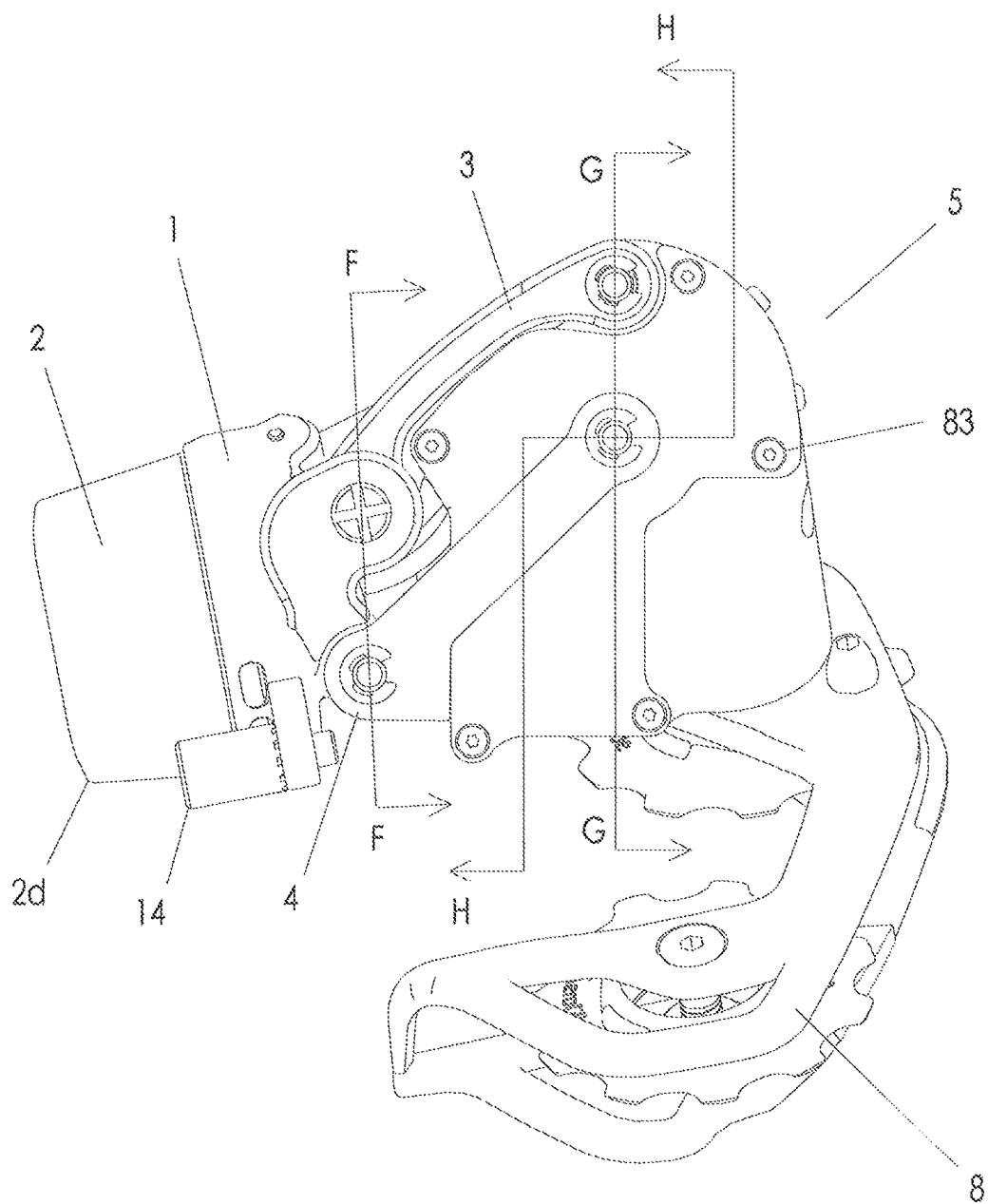
FIG. 3 is a view from E-E of the derailleur assembly of FIG. 2.
Figure 4:
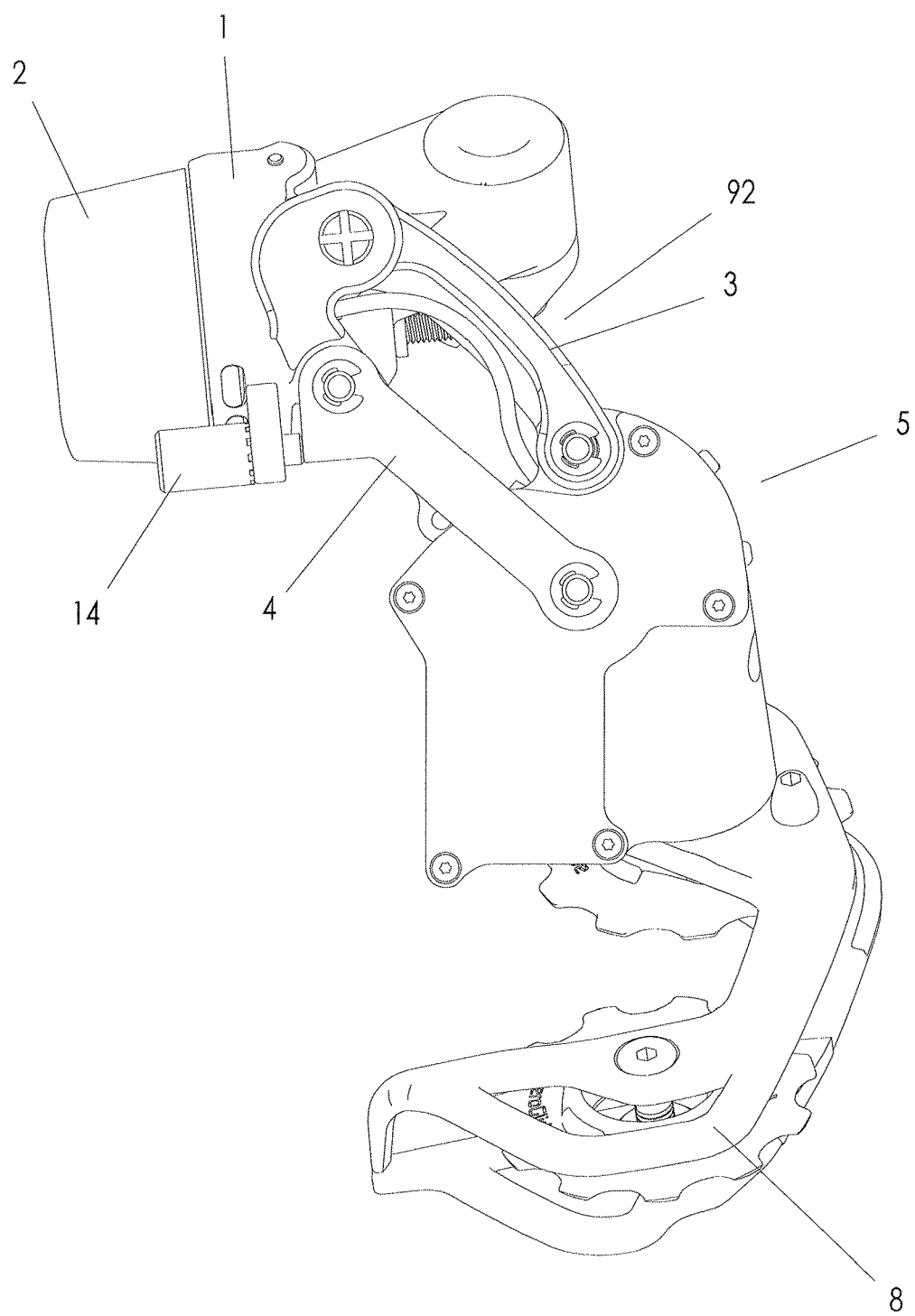
FIG. 4 is the rear derailleur assembly positioned with a cage assembly of the derailleur in an extreme inboard position.

Referring to FIGS. 1, 3, and 4, the basic structure of derailleur assembly 10 is generally similar to that of a conventional rear derailleur. The basic structure of the derailleur 10, generally shown in FIG. 1, which may be a rear derailleur and more particularly may be an electromechanical rear derailleur or gear changer includes a base member 1, which may be attached to bicycle frame 13 in a conventional manner, an outer link 3 and an inner link 4 pivotally attached to the base member, and a moveable member or assembly 5 pivotally connected to the outer and inner links at an opposite end thereof to permit displacement of the moveable assembly. The outer link 3 and inner link 4 taken together may be considered components of a linkage or link mechanism 92, for example a parallelogram-type link mechanism. Base member 1 is also known as a b-knuckle and the moveable member 5 is also known as a p-knuckle. Cage assembly 8 may be pivotally connected to moveable assembly 5 in a conventional manner. Bicycle chain 12 is engaged with cog assembly 11 and cage assembly 8 in a conventional manner and is shifted from cog to cog by the movement of moveable assembly 5 and cage assembly 8 relative to base member 1.

Figure 5:
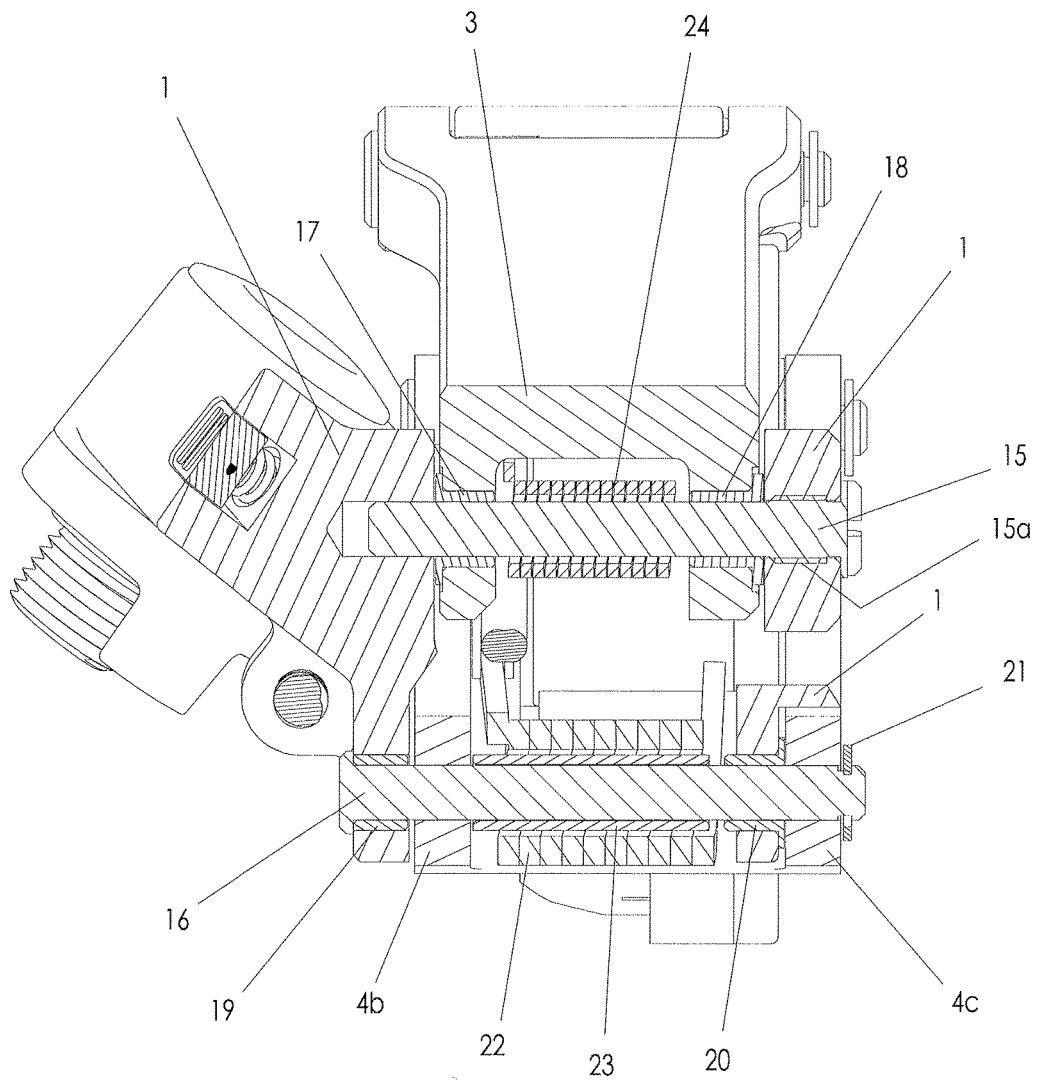
FIG. 5 is a section view along F-F of FIG. 3, with some parts omitted for clarity.

Referring to FIGS. 1-6, the link mechanism 92, referring first to FIG. 5, interconnects the base member 1 and movable member 5 and is mounted therebetween via a plurality of pivots or link pins as is well known. The linkage 92, in this embodiment, includes a first link pin 15 with a threaded portion 15*a* that is threadably engaged with base member 1 in a blind hole. First link pin inner bushing 17 is received in a first hole in outer link 3, and first link pin outer bushing 18 is received in a second hole in outer link 3. First link pin inner bushing 17 and first link pin outer bushing 18 pivotally receive first link pin 15. Thus, outer link 3 is pivotally connected to base member 1.

Second link pin inner bushing 19 is received in a second hole in base member 1. Second link pin outer bushing 20 is received in a third hole in base member 1. Second link pin 16 is received in a first hole in an inner wall 4b of inner link 4 and is also received in a second hole in an outer wall 4c of inner link 4. Second link pin 16 is pivotally received in second link pin inner bushing 19 and second link pin outer bushing 20. Second link pin retaining ring 21 engages a groove in second link pin 16 to retain the second link pin in position. Thus, inner link 4 is pivotally connected to base member 1.

Figure 6:
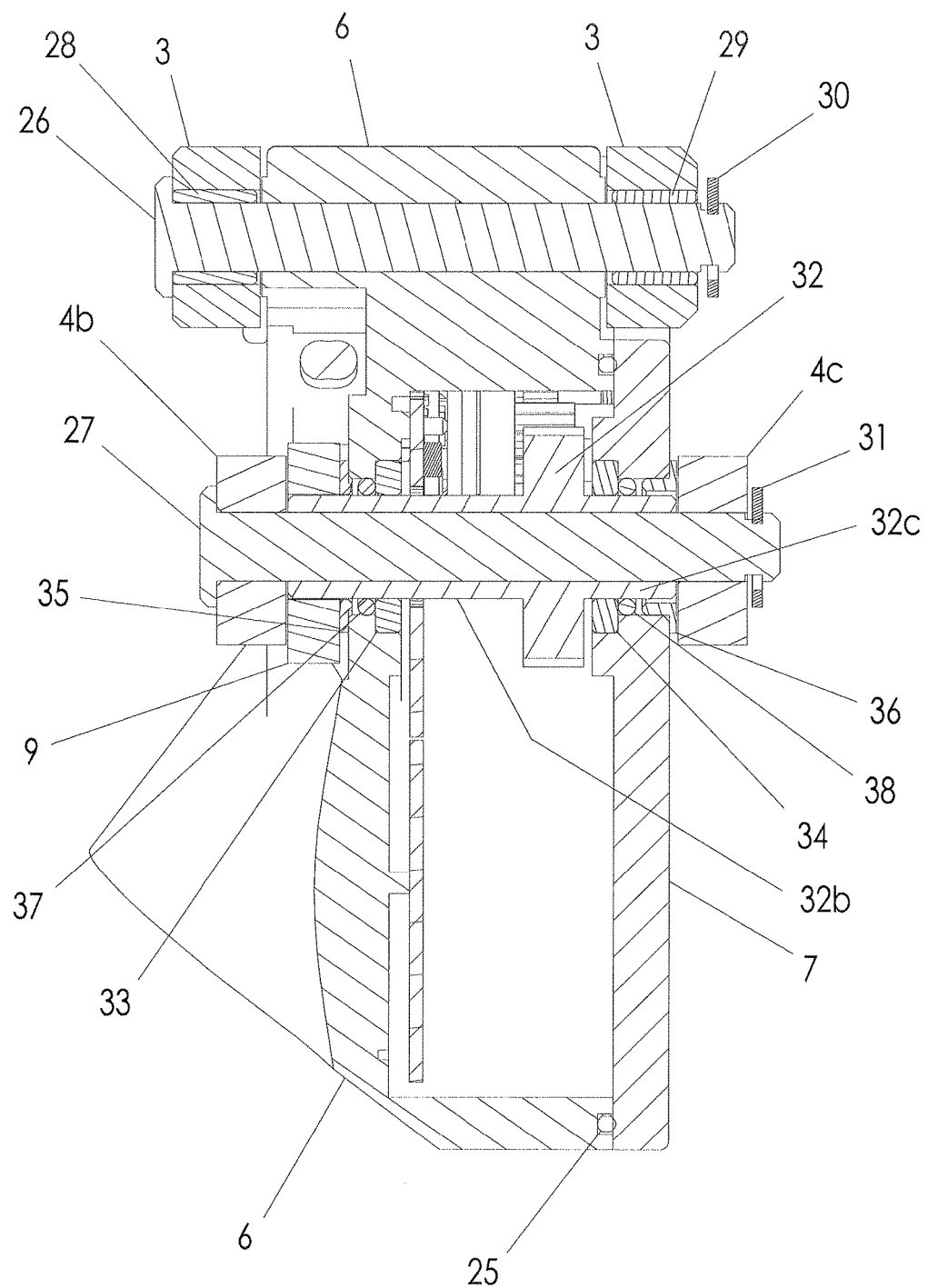
FIG. 6 is a section view along G-G of FIG. 3, with some parts omitted for clarity.
Figure 7A:
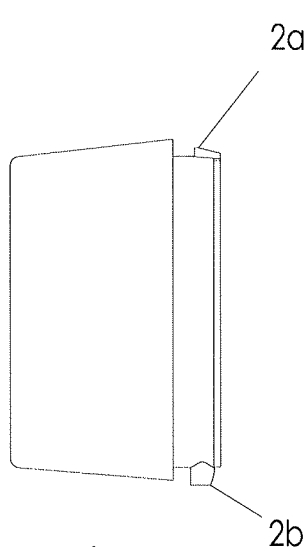
FIGS. 7*a-d* are side, front, bottom and isometric views of a power source for the derailleur, respectively.
Figure 7B:
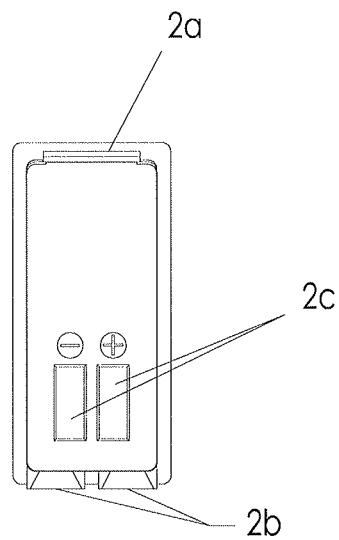
Figure 7C:
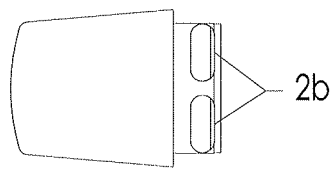
Figure 7D:
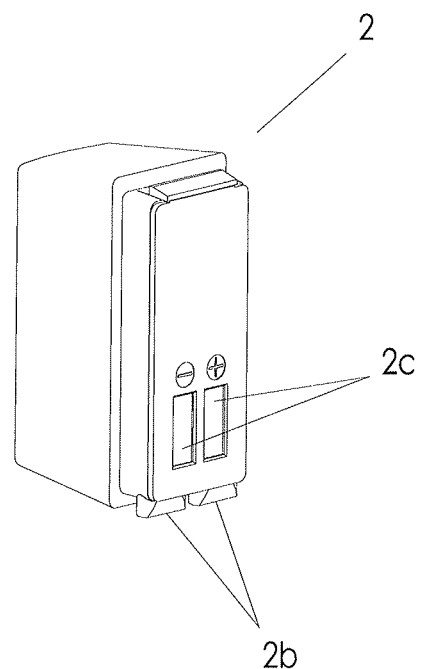

Referring now to FIG. 6, third link pin inner bushing 28 and third link pin outer bushing 29 are received in holes in outer link 3. Third link pin 26 is received in a hole in gear housing 6, and is pivotally received in third link pin inner bushing 28 and third link pin outer bushing 29. Third link pin retaining ring 30 is engaged in a groove in third link pin 26. Thus, gear housing 6 is pivotally connected to outer link 3.

Figure 17:
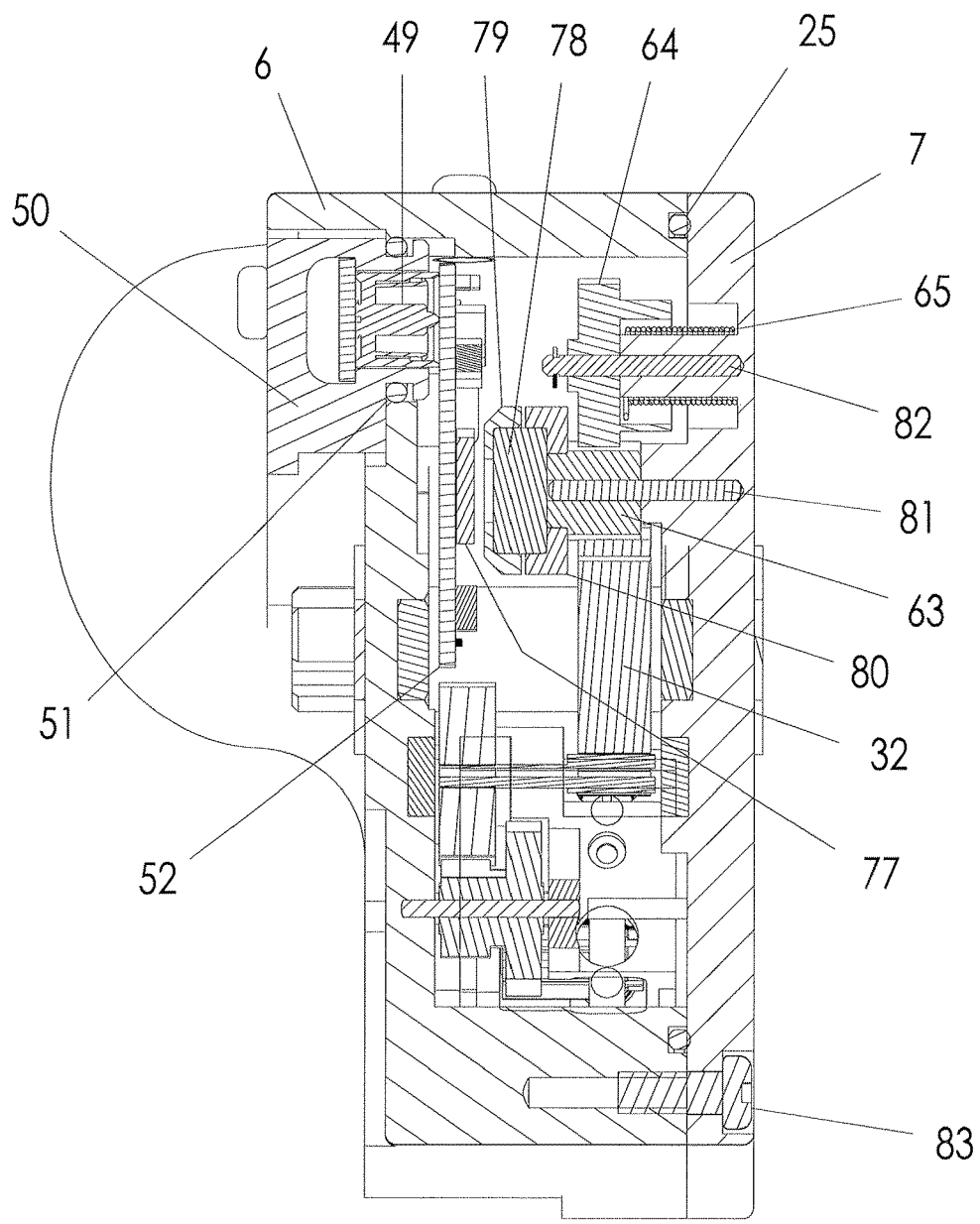
FIG. 17 is a section view along J-J of FIG. 14, with some parts omitted for clarity.

Referring to FIGS. 3, 6, and 17, cover 7 is fixed to gear housing 6 by five screws 83, or any other suitable fasteners, which pass through clearance holes in cover 7 and are threadably engaged with gear housing 6.

Referring to FIG. 6, output gear inner bearing 33 is received in a counter bore in gear housing 6, and output gear outer bearing 34 is received in a counter bore in cover 7. Output gear inner O-ring 37 is received in a hole in gear housing 6 and output gear outer O-ring 38 is received in a hole in cover 7. Output gear 32 has a first tubular portion 32b that extends through output gear inner bearing 33 and output gear inner O-ring 37, and a second tubular portion 32c that extends through output gear outer bearing 34 and output gear outer O-ring 38. Output gear 32 is located between an inner wall 4b and an outer wall 4c of inner link 4 and disposed about fourth link pin 27. Fourth link pin 27 is received in a third hole in inner wall 4b of inner link 4 and is also received in a fourth hole in outer wall 4c of inner link 4. Thus, gear housing 6 and cover 7 are pivotally connected to inner link 4. Specifically, gear housing 6, cover 7, output gear inner bearing 33 and output gear outer bearing 34 are rotatable together as a unit relative to output gear 32, inner link 4, and fourth link pin 27. Although output gear 32 and fourth link pin 27 are formed as two separate members, they may alternatively be formed together as one unitary member in a single piece.

Figure 18:
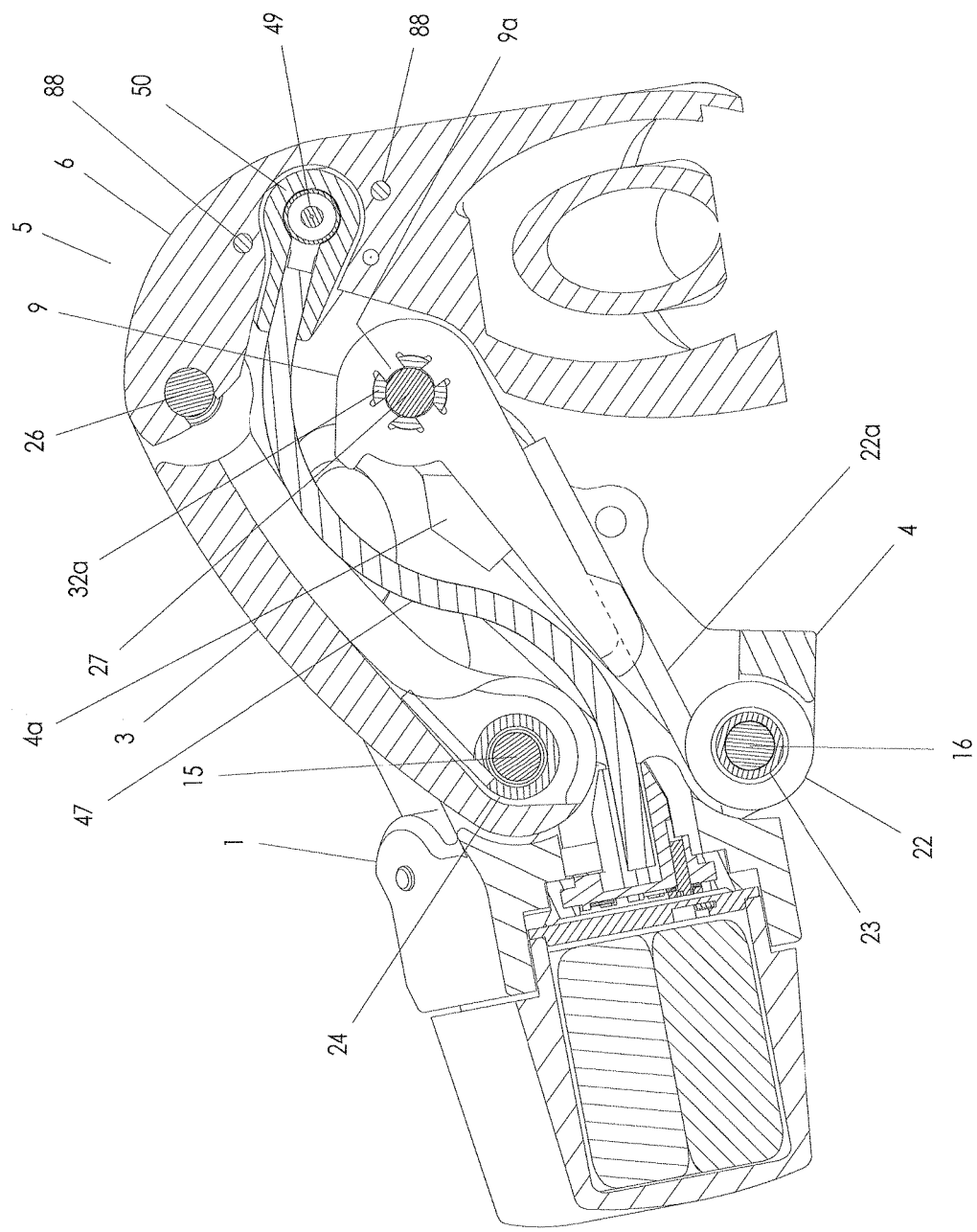
FIG. 18 is a section view along B-B of FIG. 2, with cage assembly omitted for clarity.

A fourth link pin retaining ring 31 is engaged in a groove in fourth link pin 27. Inner thrust bearing 35 is coaxially located with first tubular portion 32b and is adjacent to an exterior surface of gear housing 6. Outer thrust bearing 36 is coaxially located with second tubular portion 32c and is adjacent to an exterior surface of cover 7. Referring to FIGS. 6 and 18, projections 9a of a drive arm 9 engage castellations 32a located at a distal end of first tubular portion 32b of output gear 32. Thus, drive arm 9 is rotatably fixed to output gear 32.

It will be understood that the linkage 92 may be held to the base member 1 and movable member 5 with pivots and retaining means of other kinds and made pivotable by other than bearings and/or bushings as detailed in the instant example.

Figure 14:
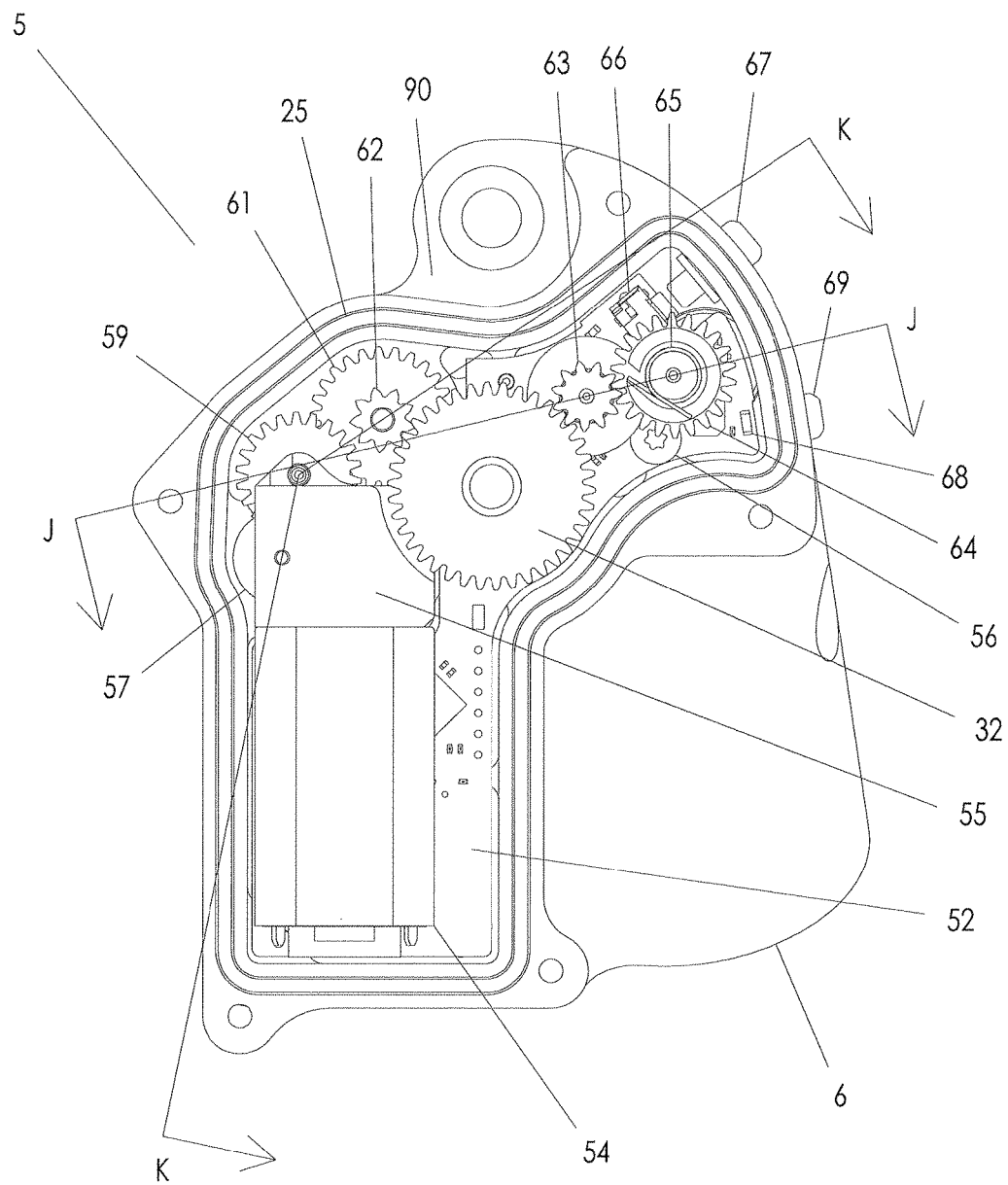
FIG. 14 is a view of the moveable assembly with the cover removed to show the motor and transmission.

Referring to FIGS. 6 and 14, gearbox gasket 25 is disposed in a groove in gear housing 6, and forms a water-tight seal between gear housing and cover 7.

Referring to FIGS. 7a-d, electrical power source 2, which may include a rechargeable battery and may be of the lithium-polymer variety, is housed within a battery housing 2d. Terminals 2c are provided on and recessed slightly below a front surface of battery housing 2d, and may be co-molded into the battery housing. A barb or catch 2a is located on a top surface of battery housing 2d, and one or more projections 2b are located on a bottom surface of the battery housing. Because of the construction (including the size and shape) of the housing 2d, including barb 2a and projections 2b, the battery housing may be removably attached to a derailleur and may be interchangeable between a front and rear derailleur. In this respect, a swappable battery 2 is a substantial improvement over a single wired battery (powering two derailleurs) should the one battery become discharged. When a pair of batteries 2 is used, with one battery installed in each of a front and a rear derailleur, the charged battery could be installed in the rear derailleur and the rear derailleur would still be functional. Also, a battery could be installed in an emergency or shared with a riding partner. In particular, the housing 2d may have a gross morphology that could be described as "laterally compressed" and which permits it to be installed on both front as well as rear derailleurs at least because the shape of the battery housing does not interfere with the user.

Referring to FIGS. 9-12, cable assembly 48 includes a flexible cable 47, which may be a two conductor cable sheathed in silicone, for example, like those manufactured by Cicoil® part number 969M101-28-2. A first end of flexible cable 47 terminates inside a boss on battery contact mounting plate 44. Two battery contacts 42, which may be made of phosphor bronze, are each secured to battery contact mounting plate 44 with a screw 43, for example, that passes through a hole in each battery contact and may be threadably engaged with the battery contact mounting plate. Battery contacts 42 may be made of or plated with a corrosion resistant material such as gold. A first conductor 47a of flexible cable 47 is electrically connected by soldering or other appropriate means to an end of one battery contact 42, and a second conductor (not shown) of flexible cable is similarly connected to an end of the other battery contact. A battery seal 41 is mounted on battery contact mounting plate 44, and may be made of silicone rubber, for example. A second end of flexible cable 47 terminates inside contact housing 50. Contact housing 50 houses a connector 49, which may be a coaxial element. Connector 49 may have two concentric conductors that are spring loaded, for example, like those manufactured by TE Connectivity®, part number 1658260-1. The two conductors 47a, 47b of flexible cable 47 are electrically connected to the two conductors of connector 49, respectively. An O-ring 51 is located in an O-ring gland in contact housing 50.

Figure 8B:
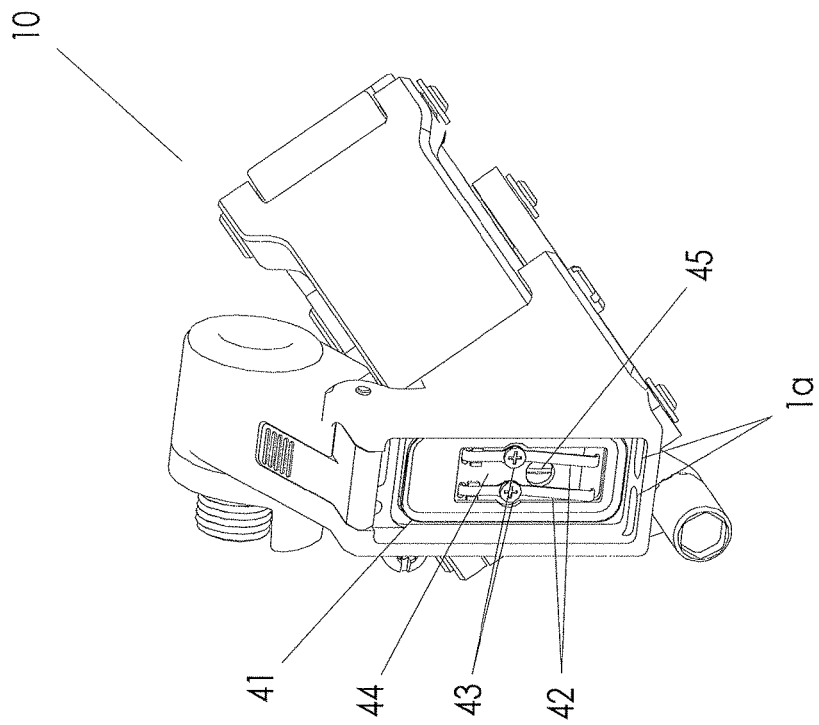
FIGS. 8*a*, 8*b* are two views showing the battery both installed and removed from the rear derailleur assembly, with the cage assembly omitted for clarity.
Figure 9:
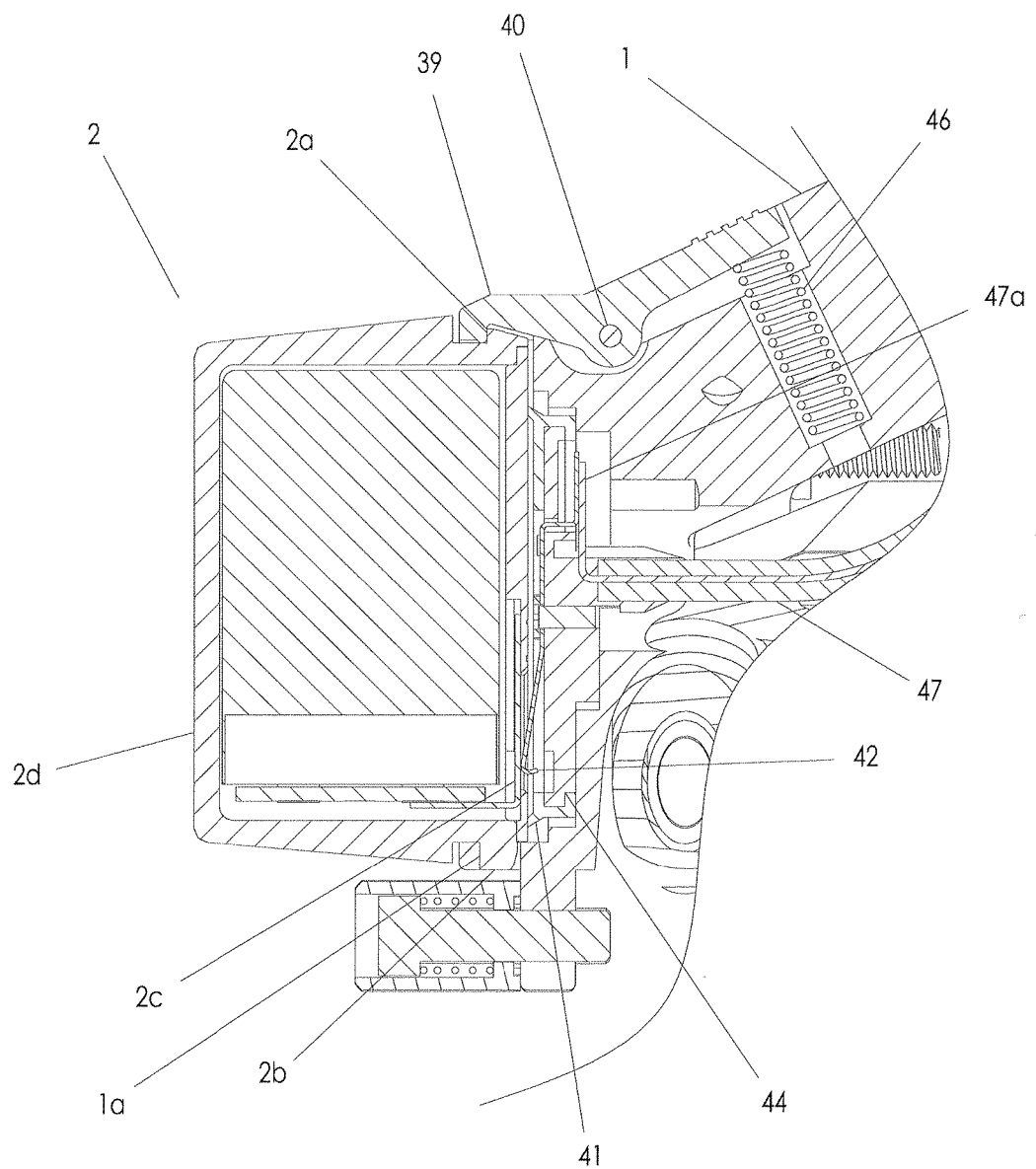
FIG. 9 is a section view along A-A of FIG. 2.

Referring to FIG. 8b and FIG. 9, battery seal 41 together with battery contact mounting plate 44 are located in a recess in base member 1. A screw 45 or other suitable fastener passes through a hole in battery contact mounting plate 44 and threadably engages base member 1, thereby fixedly connecting battery contact mounting plate 44 to base member 1. The battery mounting plate 44 may be a separate part connectable to the base member 1 as described or unitary (one-piece) with the base member.

Figure 8A:
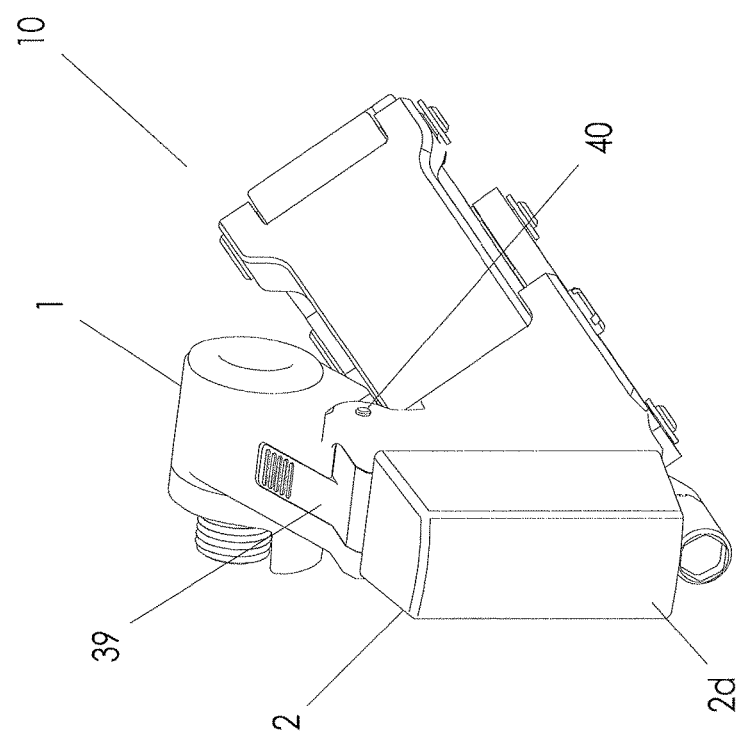

Referring to FIG. 8a and FIG. 9, battery latch pin 40 is received by the base member 1. Battery latch 39 has a corresponding thru-hole that rotatably receives battery latch pin 40. Latch spring 46 is received in a blind hole in base member 1 and urges battery latch 39 counterclockwise around battery latch pin 40 as shown in FIG. 9. Battery latch 39 has a hooked end that engages barb 2a of battery housing 2d, and the urging force of latch spring 46 urges the hooked end of battery latch against the surface of the battery housing. The latch 39 may be any suitable mechanism, catch device, engagement member, securing member and so on, to retain and release the battery housing 2d.

Referring to FIG. 8b and FIG. 9, base member 1 has two battery engaging holes 1a. Referring to FIG. 9, projections 2b of battery housing 2d are engaged in corresponding battery engaging holes 1a in base member 1. Battery housing 2d is held in an installed position that forces battery seal 41 to deform slightly, forming a water-tight seal against the front surface of the battery housing. The deformation of battery seal 41 also causes the battery seal to exert an urging force against the front surface of battery housing 2d, urging the surface to the left in FIG. 9. This urging force, in turn, causes barb 2a of battery housing 2d to be urged to the left, against the hook of battery latch 39, and causes projections 2b of the battery housing to be urged to the left, against battery engaging holes 1a. In this manner, any play between battery housing 2d and base member 1 is eliminated and the battery is positively retained on rear derailleur assembly 10. The installed position of battery housing 2d also forces battery contacts 42 to flex slightly against battery terminals 2c, creating a pressure contact between the battery contacts and the battery terminals that is conducive to the flow of electricity.

Figure 10:
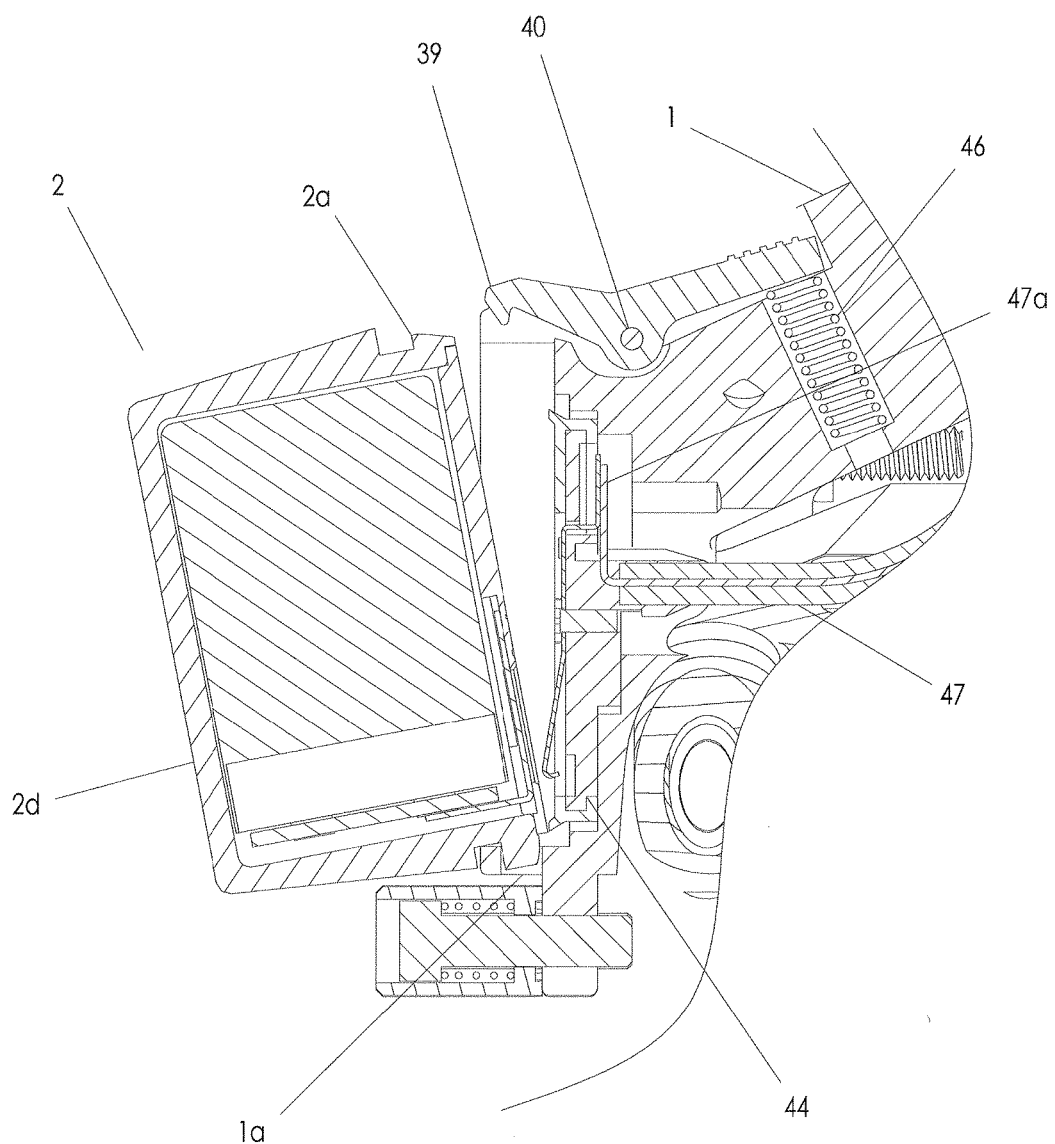
FIGS. 10 and 11 are side views of the battery, respectively, partially attached and fully detached from the rear derailleur assembly.
Figure 11:
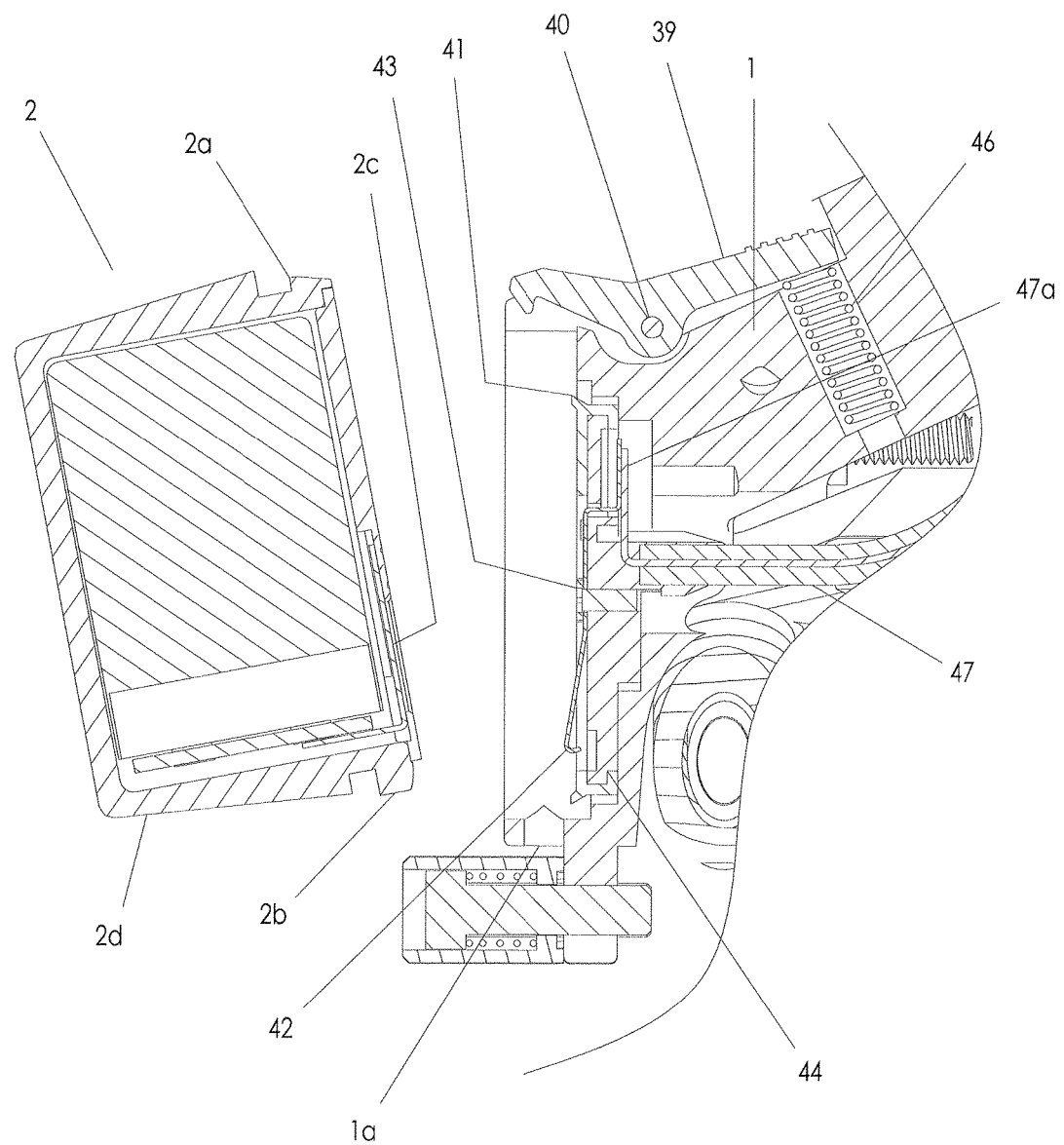
Figure 12:
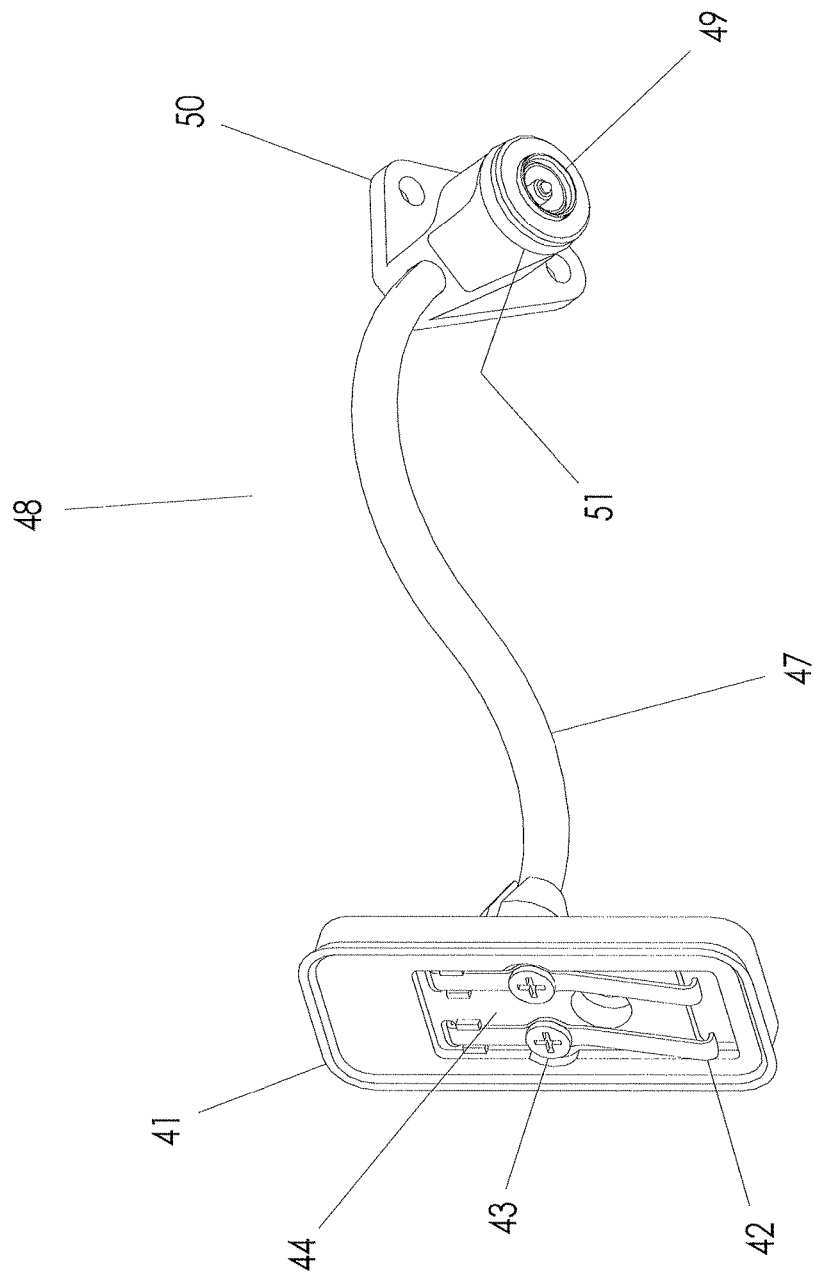
FIG. 12 is a perspective view of a flexible cable assembly.

FIGS. 10 and 11 show the process by which the user can easily remove battery 2 from rear derailleur assembly 10. Referring to FIG. 10, the user presses the right end of latch 39 downwards causing the latch to rotate clockwise around latch pin 40 against the urging force of latch spring 46, which in turn causes the hooked end of the latch to rotate out of engagement with barb 2a of battery housing 2d. The user then pivots battery housing 2d counterclockwise around the engagement point of projections 2b and battery engaging holes 1a. Referring now to FIG. 11, when battery housing 2d has been rotated sufficiently counterclockwise, the user is able to lift the battery in a generally upwards motion, causing projections 2a of the battery housing to disengage from battery engaging holes 1a of base member 1. In this manner, battery housing 2d is removed from rear derailleur assembly 10. By reversing this process, the user is able to easily reinstall battery 2 in rear derailleur assembly 10.

Figure 13:
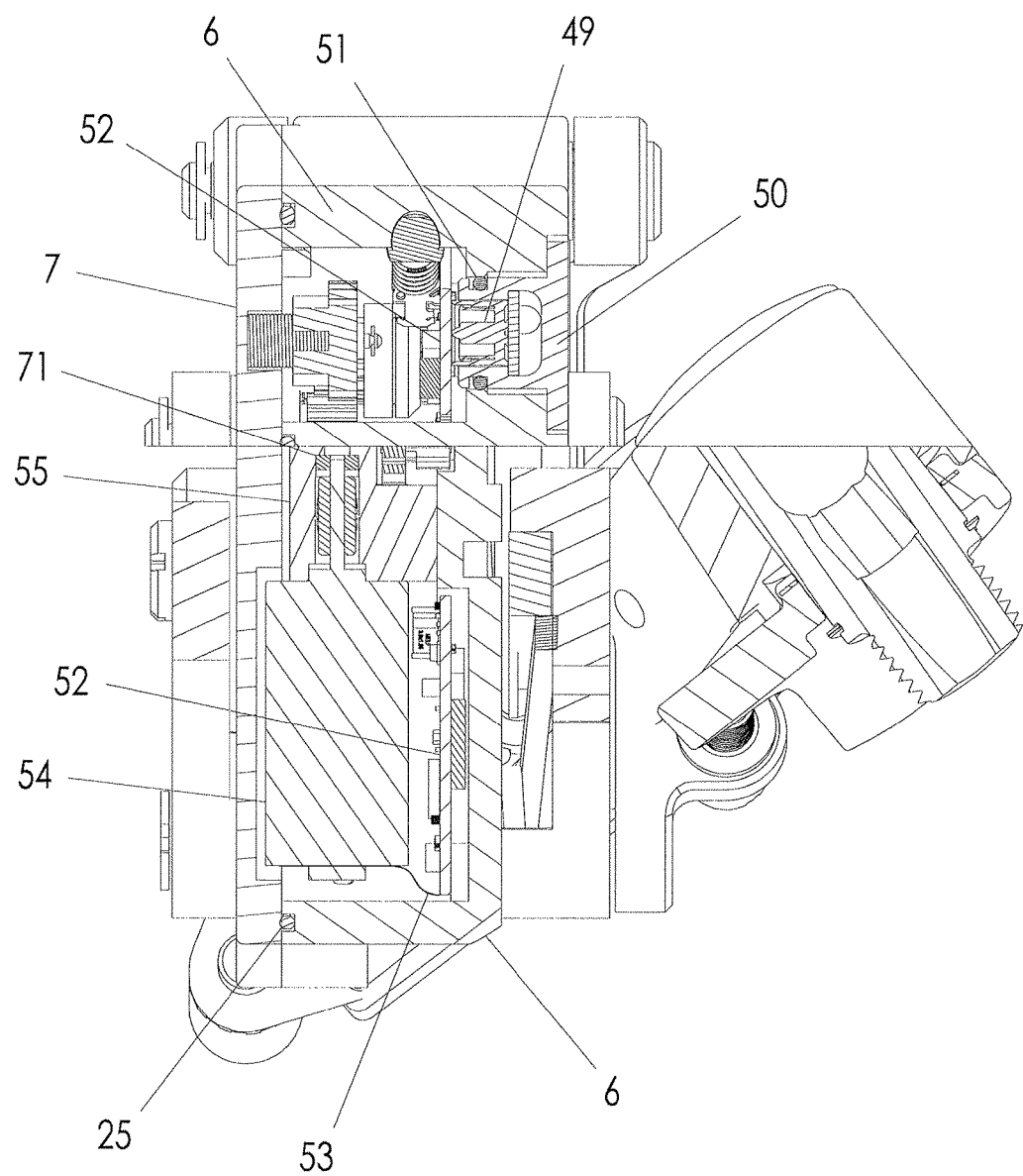
FIG. 13 is a section view along H-H of FIG. 3.
Figure 23:
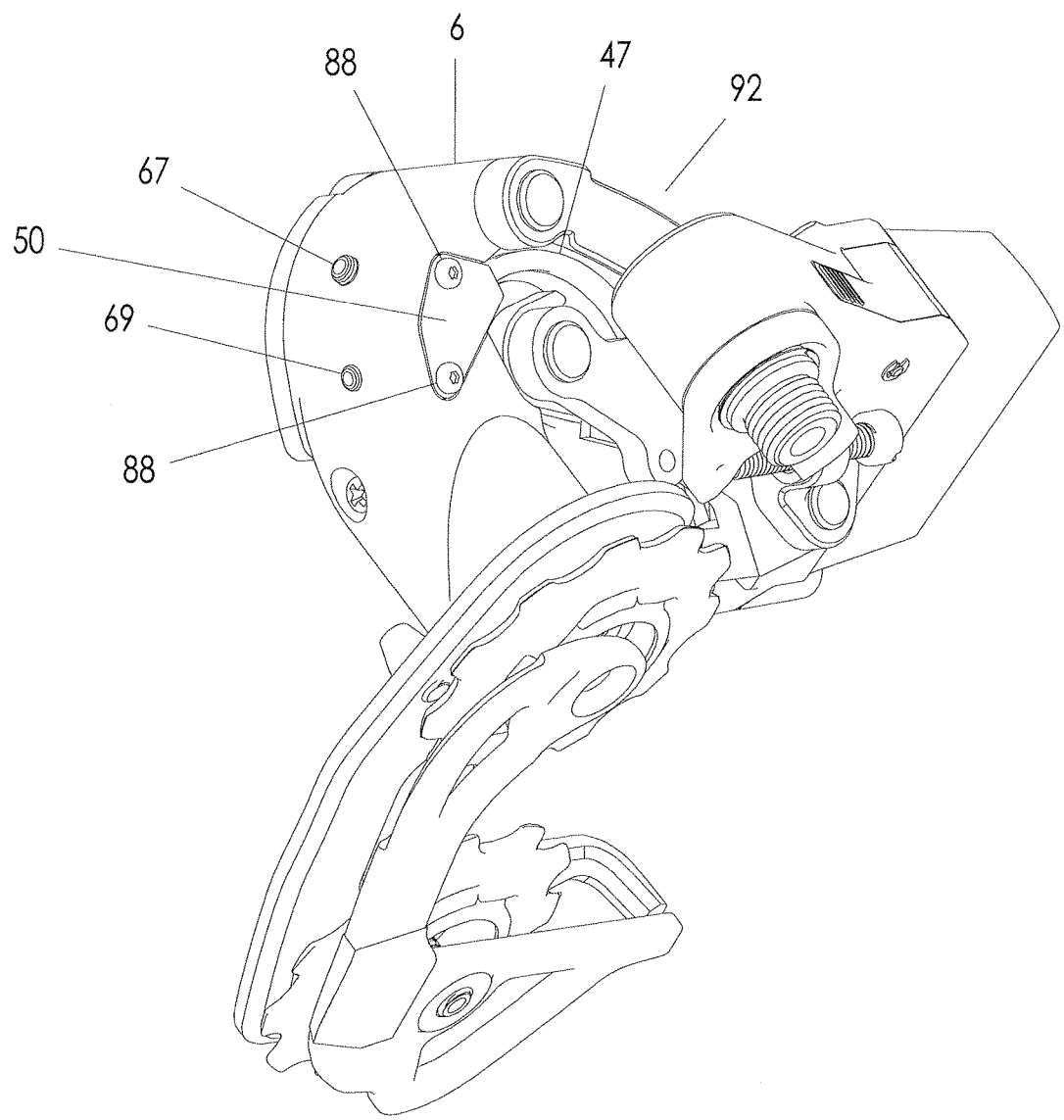
FIG. 23 is an oblique view of the rear derailleur assembly.

Referring to FIG. 18, flexible cable assembly 48 passes through a hole in base member 1 and extends between outer link 3 and inner link 4. Referring to FIGS. 13, 18, and 23, contact housing 50 of flexible cable assembly 48 is engaged in a complementary recess in gear housing 6. Two screws 88 pass through holes in contact housing 50 and are threadably engaged in holes in gear housing 6, thereby fixedly connecting the contact housing to the gear housing. Referring to FIG. 13, O-ring 51 is received in a bore in gear housing 6, and forms a water-tight seal between contact housing 50 and the gear housing.

Referring to FIGS. 13, 14, and 17, PC board assembly 52 is fixed to an inner surface of gear housing 6, such as with a screw 56. The PC board assembly includes the various electronic elements and circuitry to control the various functions of the derailleur 10. Additional locating features may be provided (not shown) in gear housing 6 to ensure that PC board assembly 52 is accurately located in the gear housing. Referring to FIGS. 13 and 17, PC board assembly 52 and contact housing 50 are positioned close enough to each other to force spring loaded connector 49 to compress, creating a pressure contact between the connector 49 and the PC board assembly that is conducive to the conduction of electricity. In this manner, flexible cable assembly 48 is in electrical communication with PC board assembly 52.

Figure 22:
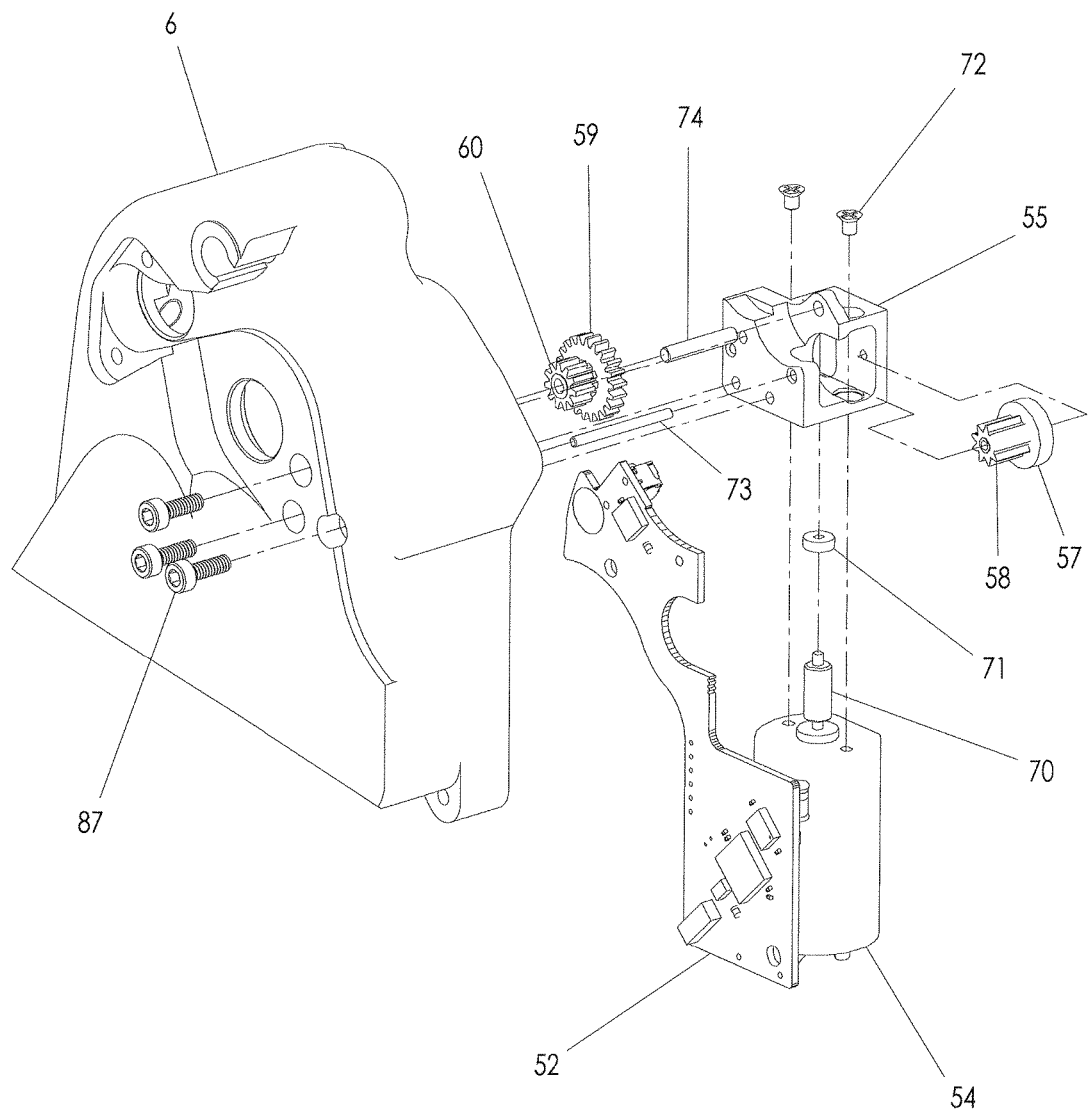
FIG. 22 is an exploded view of the moveable assembly, with some parts omitted for clarity.

Referring to FIG. 13, motor 54 is preferably a DC motor and may be electrically connected to PC board assembly 52 by a flexible cable 53. Motor 54 could instead be electrically connected to PC board assembly 52 by other means, such as jumper wires or a flexible portion of the PC board, for example. Referring to FIG. 22, motor mounting bracket 55 is fixed to gear housing 6 by three screws 87, or other suitable fasteners. Referring to FIGS. 13, 14, 15, and 22, ball bearing 71 is received in a bore in motor mounting bracket 55 and a distal end of the output shaft of motor 54 is received by the ball bearing to be rotatably supported thereby. Two screws 72, or other suitable fasteners, pass through holes in motor mounting bracket 55 and connect to motor 54, thereby securing the motor to the motor mounting bracket. The motor 54 powers a transmission 90, which effects movement of the movable member 5 relative to the base member 1 to effect positional changes of the derailleur 10.

Figure 15:
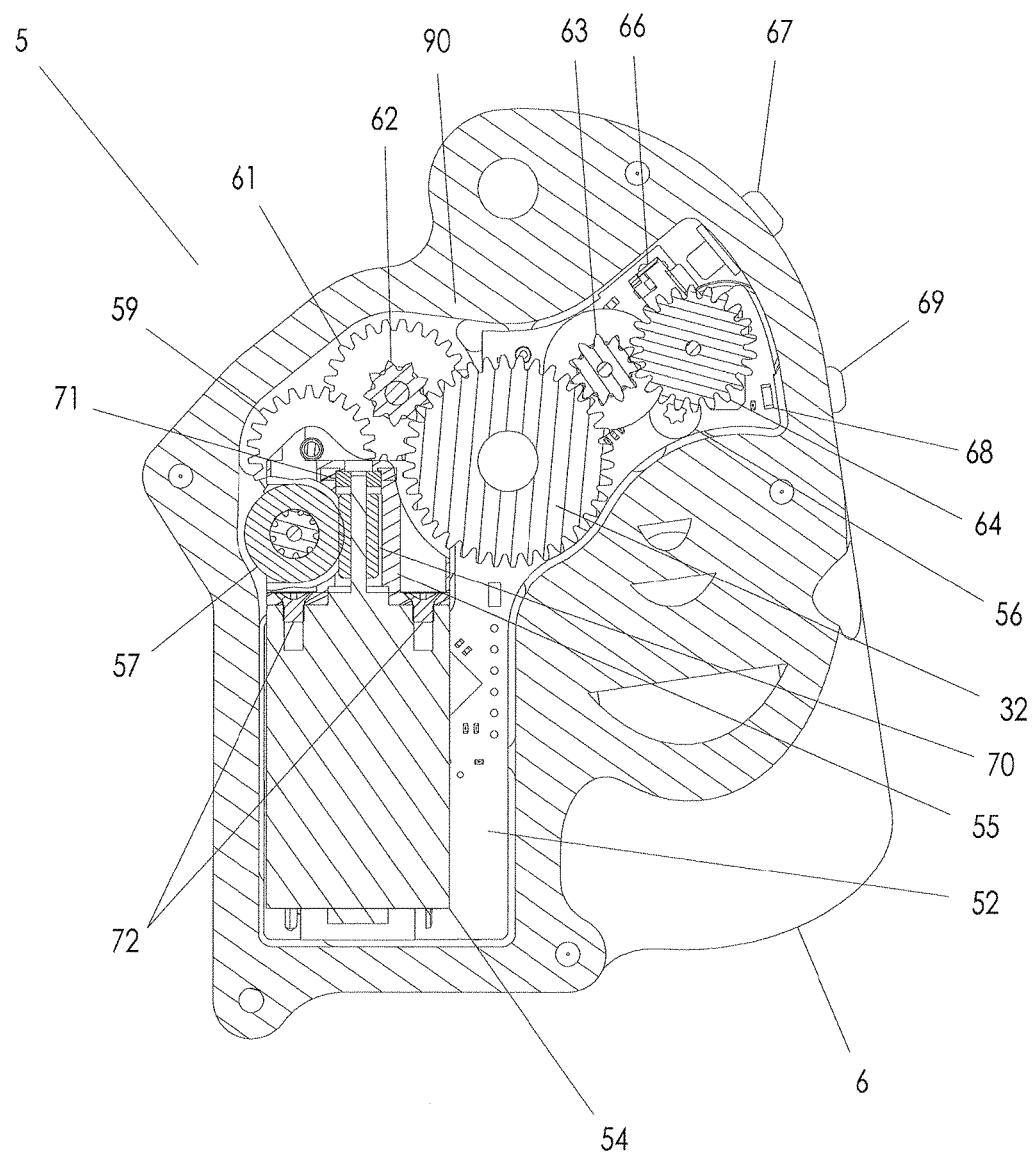
FIG. 15 is a section view along C-C of FIG. 2, with some parts omitted for clarity.
Figure 16:
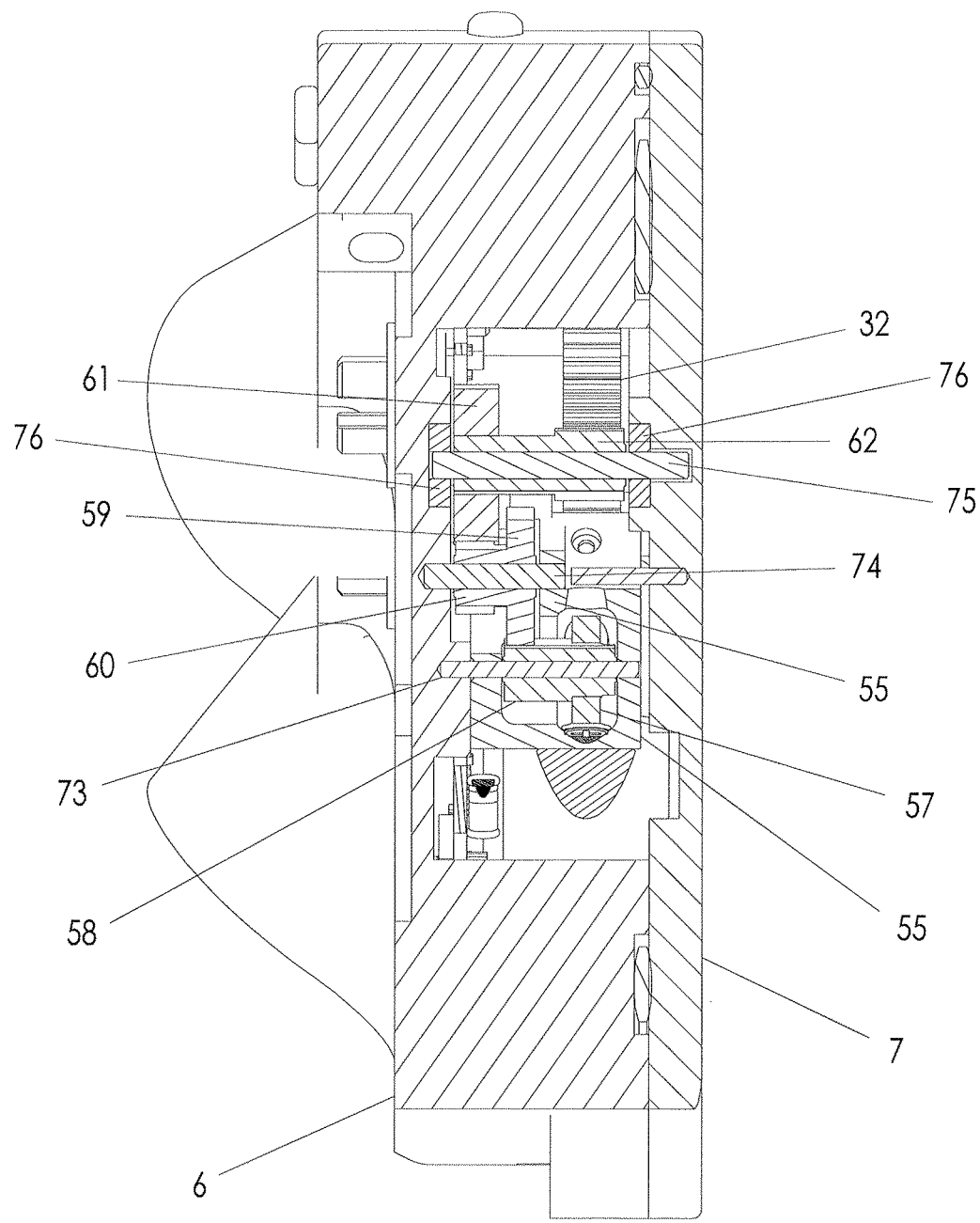
FIG. 16 is a section view along K-K of FIG. 14, with some parts omitted for clarity.

The transmission 90 conveys the motion of the motor 54 into movement of the derailleur 10 and may include a worm 70 fixed to the output shaft of the motor by a press fit or by an adhesive, for example. Referring to FIGS. 15, 16, and 22, first pinion gear 58 and worm wheel 57 may be press fit together in a conventional manner that is well known in the gear making industry, and are located in a cavity in motor mounting bracket 55 such that the worm wheel is meshed with worm 70. A thru-hole extends through both side walls of the cavity, concentric with the thru-hole in first pinion gear 58. A first pinion axle 73 is received in the thru-hole in the cavity and is rotatably received in the thru-hole in first pinion gear 58. A distal end of first pinion axle 73 extends into a blind hole in gear housing 6. One end of second pinion axle 74 is received in a blind hole in gear housing 6 and a second end of the second pinion axle is received in a hole in motor mounting block 55. Second pinion gear 60 and first spur gear 59 may be fixed together by a press fit and are rotatably received on second pinion axle 74. First spur gear 59 is meshed with first pinion gear 58. Referring to FIG. 16, a third pinion axle bearing 76 is pressed into a blind hole in gear housing 6 and another third pinion axle bearing 76 is pressed into a blind hole in cover 7. The ends of third pinion axle 75 are received in the third pinion axle bearings 76, respectively. Third pinion gear 62 and second spur gear 61 are fixed together by a press fit and are rotatably received on third pinion axle 75. Second spur gear 61 is meshed with second pinion gear 60 and third pinion gear 62 is meshed with output gear 32. It will be understood that the transmission 90 and elements thereof may be in other forms, wherein operation of the motor 54 through the transmission 90 results in movement of the derailleur 10.

Referring to FIGS. 14, 15 and 17, encoder gear axle 81 is received in a blind hole in cover 7. Magnet holder 80 and encoder gear 63 are fixed together by a press fit or may be injection molded as a single, unitary member. Magnet 78 is fixed to magnet holder 80 by a press fit or by an adhesive and magnet spacer 79 is fixed to the magnet by a press fit or by an adhesive. Encoder gear 63 is meshed with output gear 32 and is rotatably connected to encoder gear axle 81. Thus, encoder gear 63, magnet holder 80, magnet 78, and magnet spacer 79 are all rotatable together as a unit around encoder gear axle 81. The encoder gear 63 is part of the transmission 90 that is not in the load path between the motor 54 and the output gear 32.

Moreover, it is an aspect of an embodiment of the invention to size the encoder gear 63 such that the encoder gear revolves nearly 360 degrees in the full range of rotation performed by the output gear 32. In other words, if the output gear 32 rotates about 90 degrees in its full range of motion, the encoder gear can be sized to rotate about four times that of the output gear, or about ¼ the diameter of the output gear if directly attached thereto, and thus the encoder gear rotates an amount approaching, but not exceeding about 360 degrees. This provides a high amount of resolution.

Referring to FIG. 17, encoder chip 77 may be a magnetic rotary encoder with Hall Effect sensors, for example, the component manufactured by Austria Microsystems® part number AS5050, and is a component of PC board assembly 52. The center of encoder chip 77 is substantially coaxial with magnet 78. Thus the encoder may be an absolute encoder.

Again referring to FIGS. 14, 15 and 17, biasing gear axle 82 is received in a blind hole in cover 7. Biasing gear 64 is rotatably connected to biasing gear axle 82 and is meshed with encoder gear 63. A first end of biasing gear spring 65 is connected to biasing gear 64 and a second end of the biasing gear spring is connected to a support feature (not shown) in cover 7. Biasing gear spring 65 urges biasing gear 64 counterclockwise in FIG. 14 and the biasing gear in turn urges encoder gear 63 clockwise in FIG. 14, eliminating any play or backlash between encoder gear 63 and output gear 32.

Figure 20:
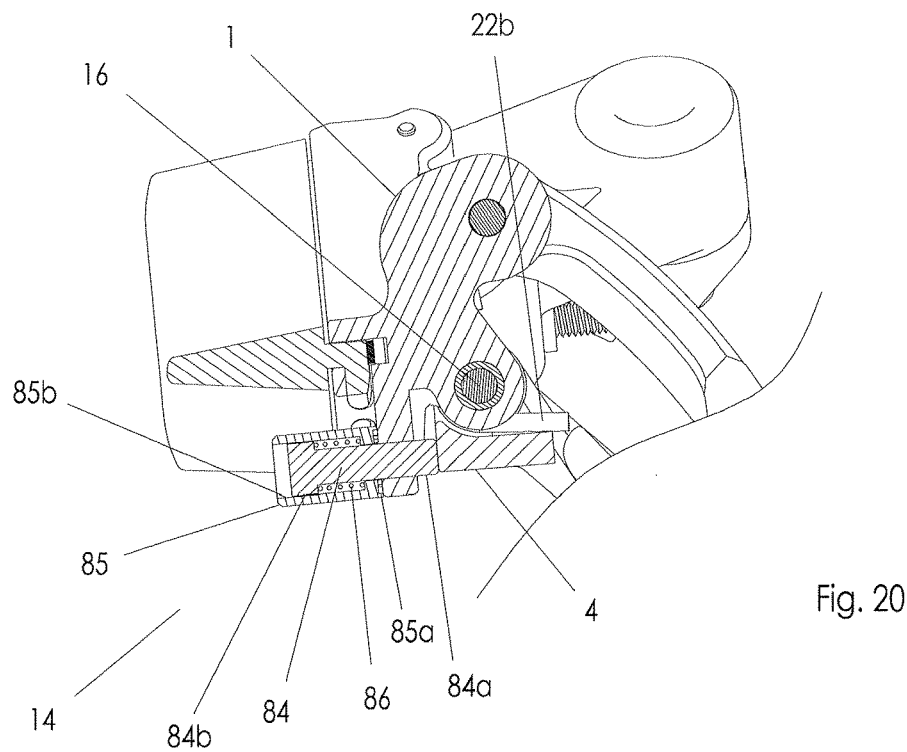
FIGS. 20 and 21 are section views along D-D of FIG. 2 showing operation of the travel limit assembly.

Referring to FIG. 18, clutch spring 22 includes clutch spring sleeve 23 disposed on the second link pin 16. The coil parts of clutch spring 22 are formed around clutch spring sleeve 23. A first leg 22a of clutch spring 22 biases drive arm 9 against projection 4a of inner link 4. Referring to FIG. 20, a second leg 22b of clutch spring 22 engages a surface of inner link 4.

Again referring to FIG. 18, the coils of biasing spring 24 are disposed around first link pin 15 and a first leg of the biasing spring urges outer link 3 counterclockwise around the first link pin. A second leg (not shown) of biasing spring 24 engages a surface of base member 1. Because inner link 4 is operatively connected to outer link 3, the inner link is likewise urged counterclockwise around second link pin 16. Because drive arm 9 is biased against projection 4a of inner link 4, and the drive arm is non-rotatably engaged with output gear 32, the urging force of biasing spring 24 is transferred back through the drive gear train to worm 70, eliminating any play or backlash in the drive gear train.

Referring to FIGS. 14, 15, and 23, button 66 may be a momentary electrical switch or the like that is a component of PC board assembly 52. Button actuator 67 may be a body of revolution that is received in a thru-hole of gear housing 6. A seal member (not shown) is disposed in an O-ring gland (not shown) of button actuator 67 and forms a water-tight seal between the button actuator and gear housing 6. When button actuator 67 is pressed by the user, it moves axially until it actuates button 66, changing its switching state. When button actuator 67 is released by the user, button 66 urges the actuator axially away from the button and the button reverts to its original switching state.

Button 66 may be used during the process of wirelessly pairing the rear derailleur assembly 10 with its corresponding user-operable shifters (not shown) and it may be used for other purposes in addition to this as well, such as fine tuning the position of cage assembly 8 relative to cog assembly 11. It will be understood that the button 66 may be used by the user to control a variety of operating parameters of the derailleur assembly 10.

LED 68 is a light-emitting diode that is a component of PC board assembly 52. Lens 69 is substantially cylindrical in shape and is fixed in a thru-hole in gear housing 6 by either a press fit or an adhesive, for example, which provides a water-tight seal between the lens and the gear housing. Alternatively, a flexible seal could be provided between lens 69 and gear housing 6 in order to create a water-tight seal. The function of LED 68 is to emit a light that passes through lens 69 and is visible to the user in order to indicate a state of the rear derailleur assembly 10 to the user LED 68 may be used during the process of wirelessly pairing rear derailleur assembly 10 with its corresponding shifters (not shown), and it may be used for other purposes in addition to this, such as indicating to the user that battery 2 is low on power. It will be understood that any configuration of the LED is contemplated whereby the LED is observable by a user.

Figure 21:
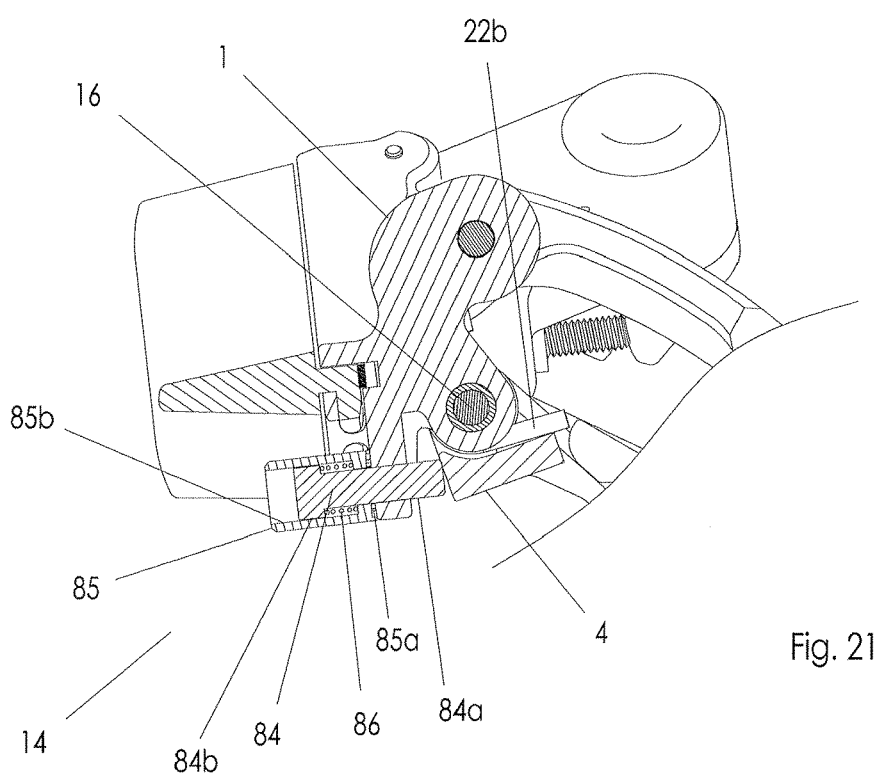

Referring to FIGS. 20 and 21, a travel limit or travel adjust mechanism 14 includes a limit screw 84 with a threaded portion 84a that is rotatably received in a thru-hole in barrel 85 and is threadably engaged with a threaded hole in base member 1. Barrel 85 has a smooth, cylindrical outer surface and a non-round. e.g., square, inner surface 85b with a square cross section that is non-rotatably engaged with but axially moveable relative to a corresponding or square portion 84b of limit screw 84, which may have a complementary square cross section. Limit screw spring 86 is a compression spring disposed around threaded portion 84a that urges barrel 85 substantially to the right in FIGS. 20 and 21, against a surface of base member 1. When the user rotates barrel 85 by hand, limit screw 84 also rotates and simultaneously moves axially relative to the barrel due its threaded engagement with base member 1. Multiple ramped recesses 85a in an end surface of barrel 85 engage complementary projections (not shown) on a surface of base member 1, creating a detenting action that retains the barrel in the position in which the user sets it.

In both FIGS. 20 and 21, inner link 4 is shown contacting the end of limit screw 84 and further clockwise rotation of the inner link around second link pin 16 is prevented by limit screw 84. The function of limit screw 84 is to limit the rotation of inner link 4 relative to base member 1 in order to ensure that cage assembly 8 does not collide with the spokes of the wheel of the bicycle on which rear derailleur assembly 10 is installed. Comparing FIGS. 20 and 21, it can be seen that in FIG. 20 limit screw 84 is relatively retracted allowing a relatively large amount of rotation of inner link 4 relative to base member 1, while in FIG. 21 the limit screw protrudes more from the base member, limiting the rotation of the inner link to a greater degree. Whereas traditional derailleur limit screws are actuated with a tool such as a hex wrench that allows the user to apply a relatively large amount of torque to the limit screw, the smooth, cylindrical outer surface of barrel 85 limits the amount of torque that the user can apply since the smooth surface of the barrel will slip between the user's fingers at a relatively low torque threshold. The advantage of this arrangement compared to traditional limit screws is that it greatly limits the amount of force that the limit screw can exert on the parallelogram of the rear derailleur assembly 10 and therefore greatly limits the amount of force that is transferred to the transmission 90 minimizing the possibility of damage to gear teeth or other components.

PC board assembly 52 includes a transceiver (not shown) wherein transceiver is a generic term describing a device that can both transmit and receive signals wirelessly. The transceiver periodically listens for wireless shift commands from shift controls, which may be actuated by actuators positioned on or in control hoods of a handlebar of the bicycle (not shown). When a wireless shift command is received by the transceiver, the transceiver forwards the shift command to a processor, and a PID control loop is used to manage a flow of electrical power from battery 2 through flexible cable assembly 48 and the PC board assembly to motor 54. The output shaft of motor 54 rotates either clockwise or counterclockwise depending on whether an upshift or a downshift is requested and causes the actuation of the transmission 90. The resulting rotation of worm 70 causes rotation of worm wheel 57, which rotates together with first pinion gear 58 to rotate first spur gear 59, which rotates together with second pinion gear 60 to rotate second spur gear 61, which rotates together with third pinion gear 62 to rotate output gear 32.

In the case that a downshift i.e. a shift to a larger cog is desired, castellations 32a of output gear 32 rotate drive arm 9 clockwise around fourth link pin 27 in FIG. 18, which in turn drives projection 4a along with inner link 4 clockwise, causing moveable assembly 5 and cage assembly 8 to move inboard towards the larger cogs. As cage assembly 8 moves inboard, encoder chip 77 along with magnet 78 are used to monitor the angular position of encoder gear 63, and when the encoder gear position corresponding to the desired cog has been reached, power to the motor 54 is shut off, as cage assembly 8 is aligned with the desired cog. As previously described, biasing spring 24 eliminates any play or backlash in the drive gear train, ensuring that cage assembly 8 is accurately and repeatably positioned.

In the case that an upshift i.e. a shift to a smaller cog is desired, castellations 32a of output gear 32 rotate drive arm 9 counterclockwise around fourth link pin 27 in FIG. 18, which in turn drives clutch spring 22 along with inner link 4 counterclockwise, causing moveable assembly 5 and cage assembly 8 to move outboard towards the smaller cogs. As cage assembly 8 moves outboard, encoder chip 77 along with magnet 78 are used to monitor the position of encoder gear 63, and when the encoder gear position corresponding to the desired cog has been reached, power to the motor is shut off, as cage assembly 8 is aligned with the desired cog. As previously described, biasing spring 24 eliminates any play or backlash in the drive gear train, ensuring that cage assembly 8 is accurately and repeatably positioned.

Figure 18A:
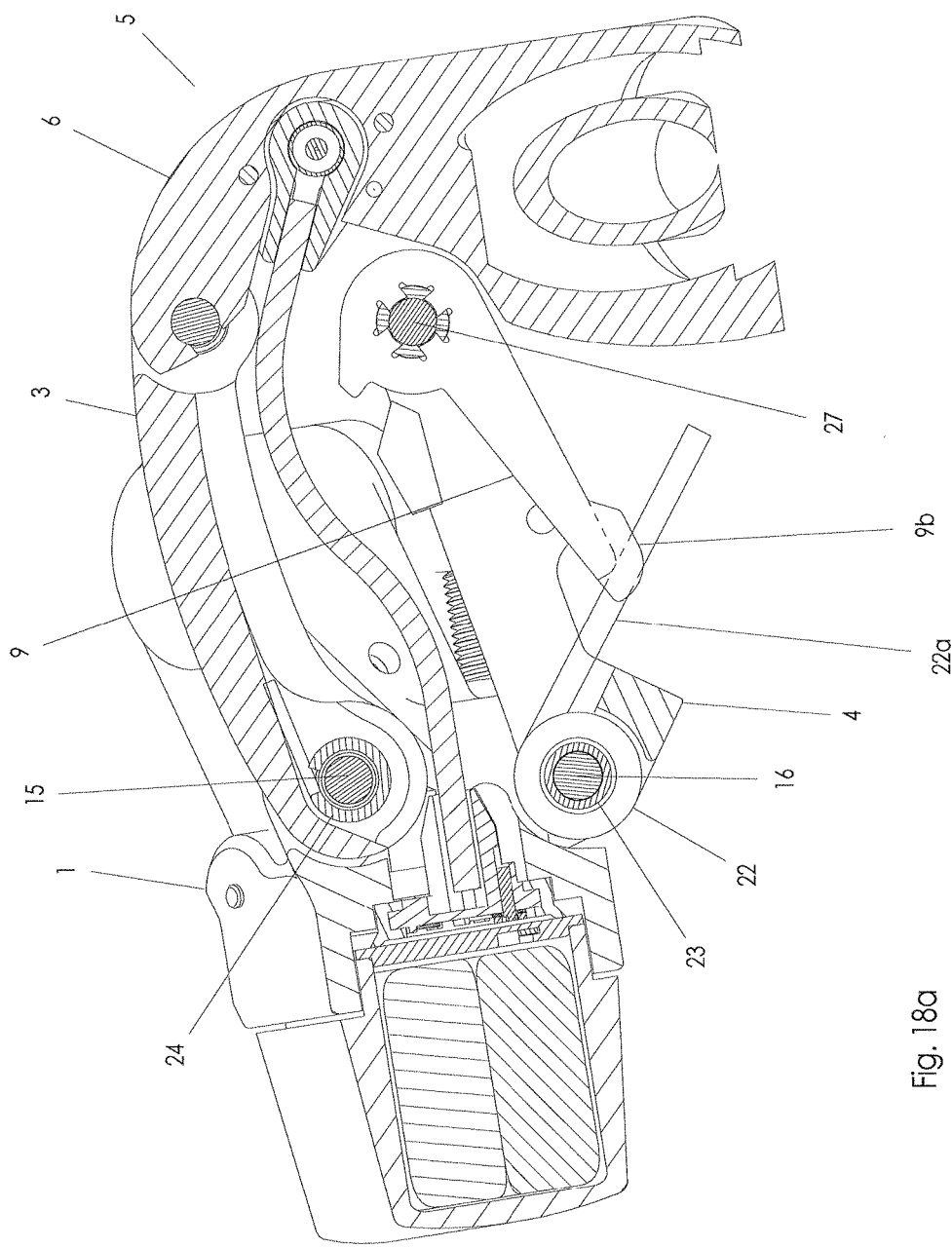
FIG. 18*a* is the same view as FIG. 18, except that a clutch spring is shown in a partially actuated state.
Figure 19:
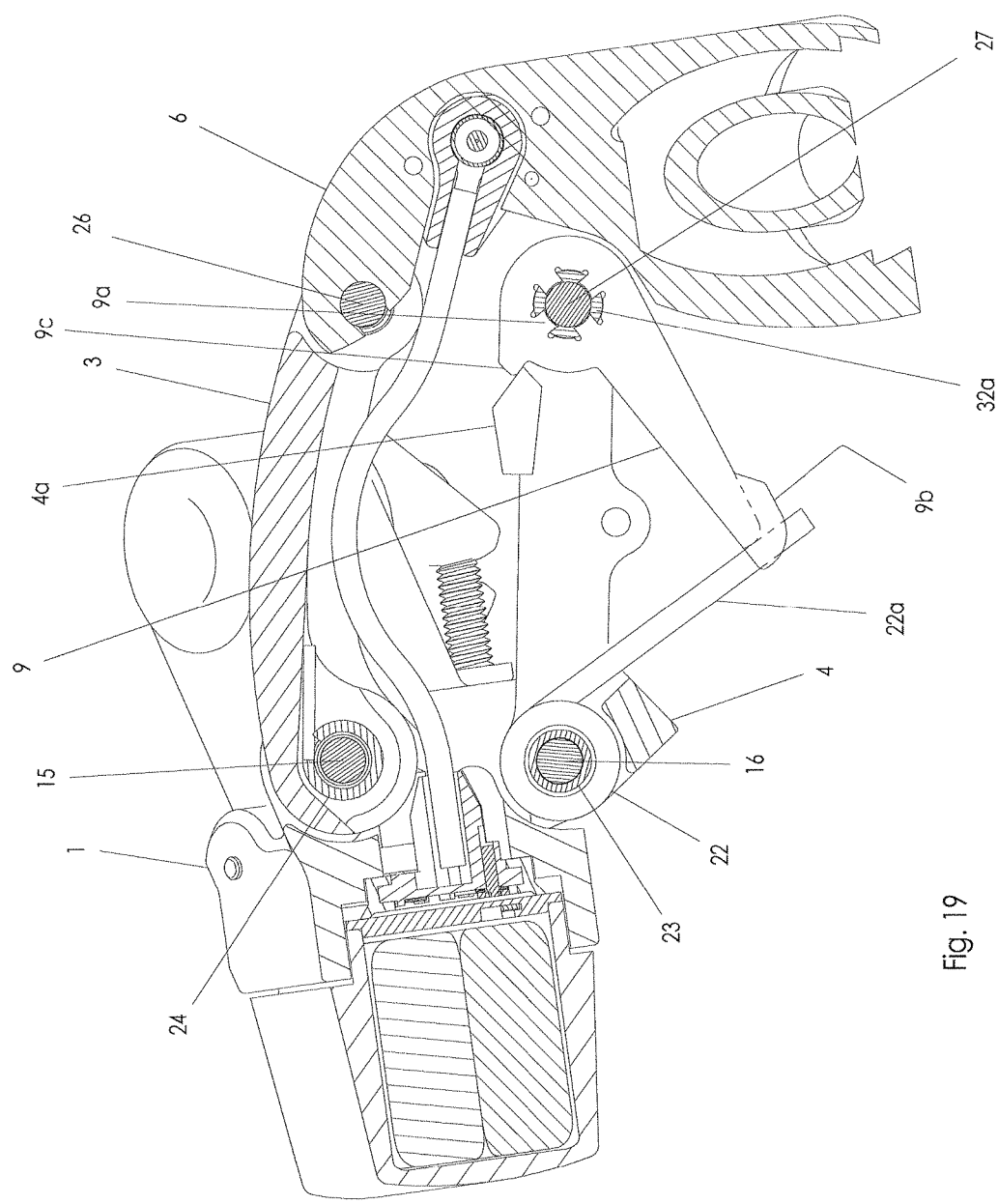
FIG. 19 is the same view as FIG. 18, except that the clutch spring is shown in a fully actuated state.

Due to the presence of worm 70 in the drive train, the drive train is not reversible. In other words, although rotation of worm 70 can drive worm wheel 57, the worm wheel cannot drive the worm, due to friction. A consequence of this is that if an external force e.g. in the event of a crash or other impact is experienced by moveable assembly 5 or outer link 3, that force will be transferred through drive arm 9 to gears of the transmission 90 drive train, and one or more of the gears or associated components may break or be damaged. In order to prevent such breakage or damage from happening, the following system may be in place. When moveable assembly 5 or outer link 3 experiences an excessive external force e.g. from a crash directed in the inboard direction, drive arm 9 overcomes the preload of first leg 22a of clutch spring 22 and deflects the first leg as shown in FIG. 18a. Thus, the energy of the external force is absorbed by clutch spring 22, and moveable assembly 5 moves relative to base member 1 without any rotation of drive arm 9 relative to the moveable assembly. In this state, guard rails 9b on either side of first leg 22a of clutch spring 22 prevent the first leg from becoming disengaged from drive arm 9. When the external force is removed from rear derailleur assembly 10, the urging force of first leg 22a of clutch spring 22 moves drive arm 9 along with moveable assembly 5 back to the position shown in FIG. 18. In extreme cases of external force applied to moveable assembly 5 and outer link 3, drive arm 9 may cause first leg 22a of clutch spring 22 to deflect as far as is shown in FIG. 19. In this state, hard stop 9c of drive arm 9 abuts projection 4a of inner link 4. When the external force is removed from rear derailleur assembly 10, the urging force of first leg 22a of clutch spring 22 is not able to move drive arm 9 and moveable assembly 5 back to the position shown in FIG. 18, and the user must manually move the moveable assembly back to the position shown in FIG. 18a, at which point the first leg will be able to move the drive arm and the moveable assembly back to the position shown in FIG. 18.

After a period of inactivity, i.e. no shift commands received, most of the electronic systems of PC board assembly 52 may shut down to conserve power. During this time the transceiver is shut down and cannot receive shift commands. A vibration sensor (not shown) is provided on PC board assembly 52 that, when it detects vibration, causes the electronic systems of PC board assembly, including the transceiver, to turn on again. The vibrations that naturally occur while riding the bicycle, which can be caused by the interaction of the road with the bicycle and by the interaction of the bicycle's various components with each other, are strong enough to activate the vibration sensor and prevent the electronic systems of PC board assembly 52 from shutting down. But when the bicycle is not being ridden, i.e. parked, the vibration sensor does not detect any vibration and most of the electronic systems of PC board assembly 52 shut down to conserve power. As soon as the rider makes contact with the bicycle, the resulting vibration activates the vibration sensor, turning the electronic systems on again. The vibration sensor may be, for example, a mems type 3 axis accelerometer, such as a Freescale® MMA7660FC or MMA845IQ, or an omnidirectional chatter-type sensor such as a Signal Quest SQ-MIN-200. It will be understood that the application to the system described above of the vibration sensor to be within the ability of an artisan of ordinary ability.

Figure 24:
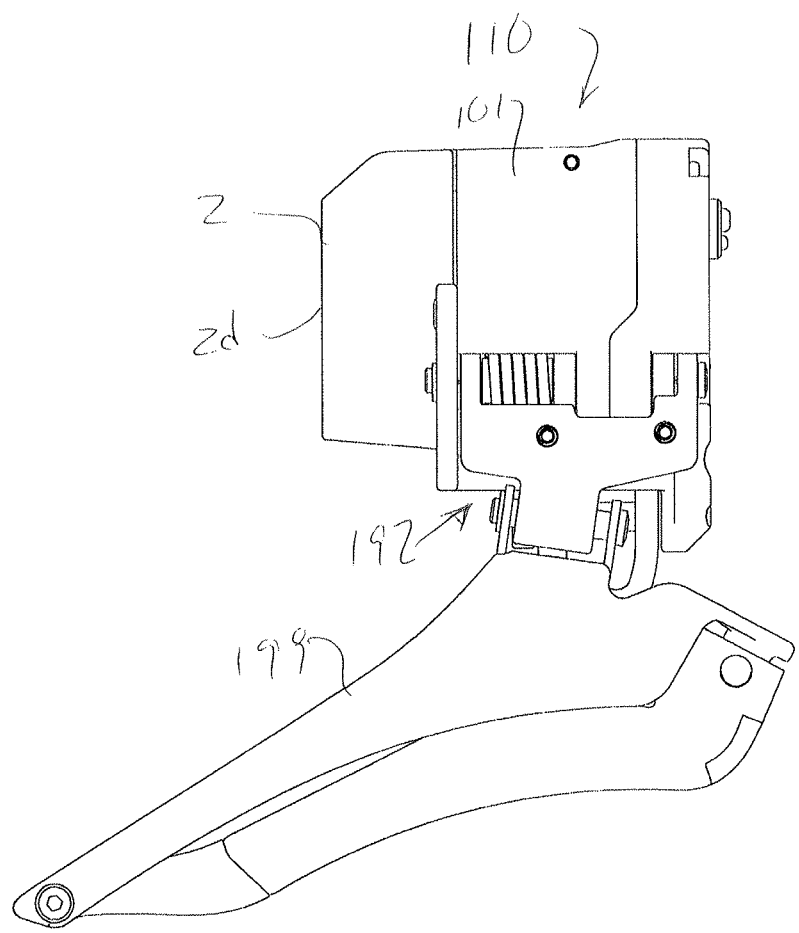
FIG. 24 is a side view of a front derailleur assembly.

Turning to FIG. 24, a front derailleur assembly 110 is shown including a battery 2 and battery housing 2d. The front derailleur assembly 110 includes a base member 101 to which the battery housing 2d is removably attached. A linkage 192 is movably attached to the base member 101. A cage assembly 199 is attached to the linkage 192. Because the battery housing 2d is shaped and sized to be attached to either a front or rear derailleur, the battery can be interchangeable therebetween. It will be understood that the base member 101 of the illustrated front derailleur assembly 110 will include a means for attaching the battery housing 2d and means for providing electrical connection that is similar or the same as that detailed with respect to the rear derailleur shown and discussed herein.

While this invention has been described by reference to particular embodiments, it should be understood that numerous changes could be made within the spirit and scope of the inventive concepts described. Accordingly, it is intended that the invention not be limited to the disclosed embodiment, but that it have the full scope permitted by the language of the following claims.

We claim:

1. An electronic rear derailleur for a bicycle, comprising:
   a base member for attachment to a frame member of the bicycle;
   a movable member having a cage assembly attached thereto;
   a linkage coupling the movable member to the base member and configured to permit movement of the movable member relative to the base member; and a motor positioned at the movable member, the motor configured to operate the linkage to move the movable member relative to the base member.

2. The electronic rear derailleur of claim 1, wherein the motor is wirelessly controllable.

3. The electronic rear derailleur of claim 1, further comprising:
a button positioned on the movable member for accessing one or more operating parameter of the electronic rear derailleur.

4. The electronic rear derailleur of claim 3, wherein the parameter is a pairing function.

5. The electronic rear derailleur of claim 1, further comprising:
a power supply configured to provide power to the motor, the power supply removably connected to the base member.

6. The electronic rear derailleur of claim 1, wherein the linkage includes an outer link and an inner link.

7. The electronic rear derailleur of claim 6, further comprising a first pin that pivotally connects the outer link to the base member, a second pin that pivotally connects the inner link to the base member, a third pin that pivotally connects the outer link to the movable member, and a fourth pin that pivotally connects the inner link to the movable member.

8. The electronic rear derailleur of claim 7, wherein the movable member includes a gear housing.

9. The electronic rear derailleur of claim 8, further comprising a transmission positioned in the gear housing, the transmission operated by the motor.

10. The electronic rear derailleur of claim 9, wherein the motor is positioned in the gear housing.

11. The electronic rear derailleur of claim 10, wherein the motor includes an output shaft with a worm disposed thereon.

12. The electronic rear derailleur of claim 11, wherein the worm operates the transmission to operate an output gear of the transmission.

13. The electronic rear derailleur of claim 12, wherein the output gear is coupled to the inner link to move the movable member.

14. The electronic rear derailleur of claim 12, wherein the transmission includes at least one gear connecting the worm to the output gear.

15. The electronic rear derailleur of claim 12, wherein the output gear is arranged on the fourth pin.

16. The electronic rear derailleur of claim 12, wherein the output gear is arranged about the fourth pin.

17. The electronic rear derailleur of claim 16, wherein the output gear is rotatably arranged about the fourth pin.

18. The electronic rear derailleur of claim 12, further comprising a drive arm coupled to the output gear, the drive arm acting on the inner link to move the movable member.

19. The electronic rear derailleur of claim 18, wherein the drive arm contacts a projection of the inner link on a first side of the drive arm.

20. The electronic rear derailleur of claim 19, further comprising a clutch spring disposed on the second pin, the clutch spring contacting the drive arm.

21. The electronic rear derailleur of claim 20, wherein the clutch spring includes a free end extending toward the movable member and contacting the drive arm on a second side of the drive arm, wherein the second side is opposite the first side of the drive arm.

22. The electronic rear derailleur of claim 12, further comprising an encoder gear meshed with the output gear.

23. The electronic rear derailleur of claim 22, further comprising a magnet holder disposed within the gear housing, the magnet holder provided with a magnet responsive to motion of the encoder gear, and a sensor positioned to sense an angular position of the encoder gear by way of a position of the magnet.

24. An electronic rear derailleur for a bicycle, comprising:
a base member for attachment to a frame member of the bicycle;
a movable member having a cage assembly attached thereto;
a linkage coupling the movable member to the base member and configured to permit movement of the movable member relative to the base member; and
a transmission positioned on the movable member, the transmission configured to move the movable member relative to the base member.

25. The electronic rear derailleur of claim 24, further comprising:
a motor positioned on the movable member, the motor configured to operate the transmission to move the movable member relative to the base member.

26. The electronic rear derailleur of claim 25, further comprising:
a power supply located on the base member, the power supply providing power to operate the motor.

27. The electronic rear derailleur of claim 25, further comprising:
an electrical conductor connecting the power supply to the motor.

28. The electronic rear derailleur of claim 27, wherein the electrical conductor is flexible.

* * * * *